United States Patent [19]

Koshiba

[11] Patent Number: 5,506,797
[45] Date of Patent: Apr. 9, 1996

[54] NONLINEAR FUNCTION GENERATOR HAVING EFFICIENT NONLINEAR CONVERSION TABLE AND FORMAT CONVERTER

[75] Inventor: Yuichi Koshiba, Hyogo, Japan

[73] Assignee: Mitsubishi Denki Kabushiki Kaisha, Tokyo, Japan

[21] Appl. No.: 345,693

[22] Filed: Nov. 21, 1994

[30] Foreign Application Priority Data

Mar. 9, 1994 [JP] Japan .................................. 6-038589

[51] Int. Cl.$^6$ .................................. G06F 1/03; G06F 5/00
[52] U.S. Cl. .................................. 364/718; 364/715.03
[58] Field of Search .................................. 364/718–722, 364/715.03, 745

[56] References Cited

U.S. PATENT DOCUMENTS

| | | | |
|---|---|---|---|
| 4,125,898 | 11/1978 | DeHart et al. | 364/718 |
| 5,220,523 | 6/1993 | Yoshida et al. | 364/718 |
| 5,412,588 | 5/1995 | Shiraishi | 364/721 |

OTHER PUBLICATIONS

"A VLSI Processor Architecture for a Back–Propagation Accelerator", Yoshio Hirose et al., IEICE Trans. Electron., vol. E75–C, No. 10, Oct. 1992, pp. 1223–1230.

"A Self–Learning Digital Neural Network Using Wafer–Scale LSI", Moritoshi Yasunaga et al., IEEE Journal of Solid–State Circuits, vol. 28, No. 2, Feb. 1993, pp. 106–114.

"Ganglion—A Fast Field–Programmable Gate Array Implementation of a Connectionist Classifier", Charles E. Cox et al., IEEE Journal of Solid–State Circuits, vol. 27, No. 3, Mar. 1992, pp. 288–299.

*Primary Examiner*—David H. Malzahn
*Attorney, Agent, or Firm*—Lowe, Price, LeBlanc & Becker

[57] ABSTRACT

An input value x of floating-point representation is added up with an input value offset by a floating point adder, to be translated to a region where an exponent part is constant. On the basis of an output from the floating point adder, an address decoder generates an address for a lookup table. The lookup table stores only mantissa data in accuracy required for a function value of a necessary nonlinear function. A bit expansion circuit converts a function value read from the lookup table to corresponding numeric data of floating-point representation. The floating point adder subtracts an output value offset and outputs a nonlinear function value of floating-point representation for translating the numeric data received from the bit expansion circuit to its original region. A nonlinear function generator is provided which can efficiently implement nonlinear conversion processing in a digital electronic circuit at a high speed.

28 Claims, 24 Drawing Sheets

FADD : FLOATING POINT ADDITION

ADec : ADDRESS DECODING

MEM : LOOKUP TABLE READING

FIG. 16

| SW[1] | XCS | φg | φq | sel[1] | sel[0] |
|---|---|---|---|---|---|
| 0 | 0 | 1 | 0 | 0 | 1 |
| 0 | 0 | 0 | 0 | 0 | 0 |
| 0 | 0 | 0 | 1 | 0 | 1 |
| 0 | 1 | 1 | 0 | 0 | 0 |
| 0 | 1 | 0 | 0 | 0 | 0 |
| 0 | 1 | 0 | 1 | 0 | 0 |
| 1 | 0 | 1 | 0 | 1 | 1 |
| 1 | 0 | 0 | 0 | 1 | 0 |
| 1 | 0 | 0 | 1 | 1 | 1 |
| 1 | 1 | 1 | 0 | 1 | 0 |
| 1 | 1 | 0 | 0 | 1 | 0 |
| 1 | 1 | 0 | 1 | 1 | 0 |

32-BIT FLOATING POINT FORMAT

SIGN PART  EXPONENT PART  FIXED-POINT PART

16-BIT FIXED-POINT FORMAT

SIGN PART

P
DECIMAL POINT POSITION
(ARBITRARILY SET)

NONLINEAR FUNCTION GENERATOR HAVING EFFICIENT NONLINEAR CONVERSION TABLE AND FORMAT CONVERTER

BACKGROUND OF THE INVENTION

1. Field of the Invention

The present invention relates to a nonlinear function generator for expressing nonlinear functions by an electronic circuit, and more particularly, it relates to a semiconductor nonlinear function generator for expressing nonlinear functions which are employed for pattern recognition/sorting and signal analysis by an electronic circuit. More specifically, it relates to a nonlinear function generator for implementing nonlinear threshold processing of neurons in a neural network by an electronic circuit.

2. Description of the Background Art

As hereinafter described, nonlinear functions are utilized in various fields of information processing such as pattern recognition and signal analysis. One of information processing techniques utilizing such nonlinear functions employs a neural network. The neural network is modelled on vital cells (neurons), and various computational techniques are proposed for employment in such a neural network. A neuron model which is employed in common for such computational techniques is characterized in a threshold processing function. Briefly stated, the threshold processing function is nonlinear conversion from an input to an output, which is known as an important function in information processing of a neural network. This threshold processing function is now described.

First, terms required for the following description are defined as follows:

Wij: Connection load value (synapse load value) indicating strength of connection (synapse connection) between j-th and i-th neurons.
Si: Output of the i-th neuron.
Uj: Total sum of weighted inputs in the j-th neuron, also called a film potential.
f(): Nonlinear conversion function employed for producing an output from the film potential in each neuron.

FIG. 34 illustrates the structure and the operation principle of a general neuron model. Referring to FIG. 34, a neuron unit i includes an input part A receiving outputs (state signals) Sj, Sk, . . . , Sm from other neuron units j, k, . . . , m, a conversion part B (corresponding to a threshold function) for converting signals received from the input part A in accordance with a predetermined rule, and an output part C for outputting a signal received from the conversion part B.

The input part A has prescribed synapse loads W (synapse loads are hereinafter generically denoted by symbol W) with respect to the neuron units j, k, . . . , m, for weighting the output signals of the neuron units with the corresponding synapse loads and transmitting the same to the conversion part B. For example, the output signal Sk from the neuron unit k is multiplied with a synapse load value Wik by the input part A and converted to Wik·Sk, and thereafter transmitted to the conversion part B.

The conversion part B obtains the total sum of the signals received from the input part A, and fires when the total sum satisfies certain conditions, to transmit a signal to the output part C. In this neuron unit model, the input part A, the conversion part B and the output part C correspond to a dendrite, a cell body and an axon of a vital cell respectively.

In this neuron model, output states which can be implemented by each neuron vary with the model as applied. In a Hopfield model or a Boltzmann machine, it is assumed that each neuron unit enters two states, i.e., Si=0 (non-firing state) and Si=1 (firing state). In a perceptron model or the like, it is assumed that outputs of neuron units generally take continuous values in a range of 0 to 1.

Signal input/output relations in a neuron unit are generally expressed as follows:

$$Ui = \Sigma Wij \cdot Sij + \theta i$$

$$Si = f(Ui)$$

where θi represents a self connection factor, and the total sum Σ is calculated as to all inputs in the i-th neuron unit. Therefore, it is interpreted that each neuron unit takes a sum of products of all inputs received therein with corresponding synapse loads and carries out threshold processing, i.e., nonlinear conversion processing of a film potential Ui obtained as the result, to generate an output. In other words, a neuron unit is an arithmetic unit having a multi-input, one output threshold processing function. It is considered that the nonlinear threshold processing in this neuron unit is one of factors by which a neural network implements a flexible information processing function of high quality.

While various types of nonlinear conversion are employed in conventional neural networks, saturated nonlinear functions are employed in most of the neural networks. A saturated nonlinear function implements such conversion that a nonlinear conversion output f(x) with respect to an input x is a<f(x)<b, where a and b represent constant values, in the overall variable area of the input x. Monotonous, non-decreasing functions are employed as nonlinear functions for a neural network, and a typical example of such a monotonous non-decreasing function is a sigmoid function, which is expressed as follows:

$$f(x) = \frac{1.0}{1.0 + \exp\left(-\frac{x}{T}\right)}$$

where T represents the temperature of the network, and 1/T is also called a slope of the function.

FIG. 35 illustrates the shape of a sigmoid function with a temperature T at 1. The sigmoid function loosely rises when the temperature T is increased. As clearly understood from the aforementioned expression of the sigmoid function and the shape shown in FIG. 35, the sigmoid function (conversion) f(x) is a saturated nonlinear function (conversion) having a value area of 0.0 <f(x)<1.0. The value of this sigmoid function is extremely changed in a considerably limited variable area.

Various methods have heretofore been proposed as to implementation of a threshold processing function with an electronic circuit in the aforementioned neuron unit. Such conventional methods are roughly classified into those employing analog electronic circuits and those employing digital electronic circuits. Description is now made on methods of implementing threshold processing functions with digital electronic circuits, which are related to the present invention.

The methods of implementing nonlinear conversion with digital electronic circuits are roughly classified into two types. One is a technique of approximating nonlinear functions through series (function) expansion, and the other one is a function table reference method (lookup table method) of storing function values in a memory and employing the memory as a lookup table. The approximation technique employing series expansion is first described.

The approximation technique employing series expansion is a most general and accurate operating technique among the methods approximating series-expandable nonlinear functions. The aforementioned sigmoid function f(x) is approximated in proximity (h) to zero as follows, for example:

$$f(h) = \frac{1}{2} + \frac{h}{4} - \frac{h^3}{96} + O(h^5)$$

Advantages of this technique is that it is possible to implement approximation in extremely high accuracy by increasing the number of approximation terms and that it is possible to carry out operations only with a function of taking sums of products regardless of the input data form such as integer representation, fixed-point representation or floating-point representation.

However, the approximation technique employing series expansion has such a disadvantage that a large number of processing steps are required for the operations. For example, approximation employing N terms requires (2N+1) operation steps at the minimum, due to requirement for operation steps for calculating values of the respective terms and total sums of these values with repetition of addition every two terms. When a nonlinear conversion circuit is formed in accordance with this approximation technique, therefore, a large number of clock cycles are required for nonlinear conversion processing and hence it is impossible to execute conversion processing (threshold conversion processing) at a high speed.

A structure of implementing sigmoid conversion (calculation of output values employing sigmoid functions) by an electronic circuit with series expansion is disclosed in "A VLSI Processor Architecture for a Back-Propagation Accelerator" by Hirose et al., Japanese Institute of Electronics, Informations, Communications Engineers, Transaction, Electron, Vol. E75-C, No. 10, October 1992, pp. 1223–1230, for example. A sigmoid function f(Ui) employed in this literature is expressed as follows:

$$f(Ui) = \frac{1}{2} \left\{ 1.0 + \tanh\left( \frac{Ui}{T} \right) \right\}$$

This sigmoid function f(Ui) is approximated through the following expressions:

$$g(x) = \frac{1}{2} + \sum_n (-1)^{n-1} \cdot \frac{2^{2n-1} \cdot (2^{2n} - 1) \cdot Bn \cdot x^{2n-1}}{(2n)!}$$

$$: 0 < \left| \frac{Ui}{T} \right| \leq 0.78$$

$$g(x) = \sum_n (-1)^n \cdot \exp(-2nx)$$

$$: 0.78 < \left| \frac{Ui}{T} \right| \leq 6.3$$

$$g(x) = 1 : \left| \frac{Ui}{T} \right| > 6.3$$

where the coefficient Bn is a Bernoulli's number. In the aforementioned approximation expressions, the output f(Ui) is decided depending on a positive/negative value of the film potential Ui:

$$f(Ui) = g(Ui) : Ui > 0$$

$$f(Ui) = 1 - g(Ui) : Ui \leq 0$$

In series expansion, a variable area (range of values of input variables) effectuating approximation is extremely limited. Therefore, the approximation expressions as employed are varied with the variable areas, as described above. Thus, a plurality of approximation expressions are required for approximating a single sigmoid function to execute separate calculations in accordance with the variable areas, leading to increase in calculation cost.

The lookup table method is now described.

FIG. 36 schematically illustrates a structure for implementing the lookup table method. Referring to FIG. 36, a lookup table 982 which is formed by a memory stores all data to be referred to. An address decoder 981 performs necessary working on input values and generates addresses for the lookup table 982, for supplying the same to the lookup table 982. Data read from addressed positions of the lookup table 982 are outputted through an output buffer 983.

When nonlinear conversion is executed on an input value, a nonlinear function value is stored in a corresponding position of the memory with an address of a numeric value corresponding to the input value. The address decoder 981 performs necessary working such as truncation of a lower bit, for example, on this input value and generates an address. The lookup table 982 outputs the nonlinear function value corresponding to the input value, for output through the output buffer 982. The feature of this lookup table method resides in that it is possible to readily increase the processing speed as compared with the aforementioned method based on series expansion, since nonlinear conversion processing can be basically carried out in a time for reading data from the memory.

FIG. 37 illustrates the structure of a conventional neural network employing the aforementioned lookup table method. The structure shown in FIG. 37 is disclosed in "A Self-Learning Digital Neural Network Using Wafer-Scale LSI" by Yasunaga et al., IEEE Journal of Solid-State Circuits, Vol. 28, No. 2, February 1993, pp. 106–114, for example.

The neural network shown in FIG. 37 includes four neuron units 990, for example. Each neuron unit 990 has a synapse circuit 992 including a memory storing synapse load values for multiplying input values by corresponding synapse load values, and a neuron circuit 991 for obtaining the total sum of outputs of the synapse circuit 992 for calculating a film potential. The neuron circuits 991 of the neuron units 990 are connected to an input part of a conversion table 994 in common through a time sharing input data bus 993. An output part of the conversion table 994 is connected to the respective synapse circuits 992 of the neuron units 990 through a time division multiplexing output data bus 996. A control circuit 997 is adapted to generate operation timings in the neuron units 990 and addresses for the memories included in the synapse circuits 992.

The conversion table 994 stores output values with input values of functions employed for threshold conversion processing as addresses.

In operation, outputs of lower layer neuron units are successively transmitted onto the output data bus 996. The neuron units 990 execute sum of product operations on output data supplied onto the output data bus 997 in accordance with address signals and control signals received from the control circuit 996 through a control signal bus 995. When the sum of product operations are completed and the neuron units 990 calculate film potentials respectively, the outputs of the neuron units 990 are successively transmitted onto the time division multiplexing input data bus 993 under control by the control circuit 997, to be supplied to the conversion table 994. The conversion table 994 transmits values stored in corresponding positions onto the output data bus 996, with employing, as address signals, the outputs received on the input data bus 993. The conversion table 994 stores conversion function values, as described above. Thus, the outputs of the neuron units 990 are successively outputted onto the time division multiplexing output data bus 996 in accordance with the film potential data supplied onto the time division multiplexing input data bus 993 at a high speed. When the neuron units 990 also express those of other layers in the neural network shown in FIG. 37, the data outputted from the conversion table 994 are again transmitted onto the time division multiplexing output data bus 996 in series through the data bus 996. Thus, operations are executed in a next layer.

As shown in FIG. 37, the conversion table 994 outputs corresponding function values onto the output data bus 996 with the film potential data received on the time division multiplexing input data bus 993 as addresses. According to this structure, therefore, addresses for the conversion table 994 can be extremely readily generated so that it is possible to execute nonlinear conversion only in a time required for reading the data from the conversion table 994.

As described above, it is possible to execute nonlinear conversion processing at a high speed by employing the lookup table method. In this method, however, it is necessary to store all basically required data in the memory, and hence the occupied area of the conversion table 994 is increased to obstruct integration. When the conversion table 994 is arranged in an integrated circuit for structuring a neural network, the storage capacity cannot be sufficiently increased in consideration of the occupied area. Thus, it is difficult to store all conversion data and hence this method is inferior in conversion accuracy to the method employing series expansion.

In the lookup table method utilizing such a conversion table, further, the numeric data as employed are expressed in various forms, and numeric data of floating-point representation are generally employed when high operation accuracy is required. Description is now made on problems of the lookup table method which is applied to such numeric data in floating-point representation. Before the problems are explained specifically, numeric data representation systems, i.e., floating-point representation and fixed-point representation are described.

A numeric value of floating-point representation is expressed under a normalization format of IEEE as follows:

$$(-1)^S \cdot (1.00+F) \cdot 2^E$$

where S represents a sign flag, E represents an exponent part (a characteristic), and F represents a mantissa. The mantissa F is expressed in the form of $\Sigma a_i \cdot (\frac{1}{2})^i$, where the coefficient $a_i$ is a numeric value of 0 or 1.

FIG. 38 illustrates the structure of standard 32-bit (single precision) floating point numeric data. As shown in FIG. 38, a sign part 191 is formed by a 1-bit sign flag and an exponent part 192 expresses the exponent E in eight bits, and a mantissa 193 expresses the mantissa F in 23 bits.

FIG. 39 illustrates the structure of standard fixed-point numeric data. As shown in FIG. 39, the fixed-point numeric data is formed by a 1-bit sign flag forming a sign part 201, and a mantissa 202 formed by remaining 15 bits. A decimal point P can be set in an arbitrary position. However, the position of the decimal point P as set is thereafter fixed. A certain numeric value is now specifically expressed in floating-point representation and fixed-point representation.

$$3=(-1)^0 \cdot (1.00+0.50) \cdot 2^1,$$

and hence 32-bit floating-point representation is as follows:

$$3=0\ 10000000\ 10000000000000000000000$$

On the other hand, 16-bit fixed-point representation is as follows, for example:

$$3=000011.0000000000$$

In the floating-point representation, the minimum value—127 of the exponent part is made to correspond to "00000000", and the maximum value 128 is made to correspond to "11111111". Another form may be employed. The floating-point representation requires three variables of a 1-bit sign part, an 8-bit exponent part and a 23-bit mantissa, in order to express a single numeric value. On the other hand, the fixed-point representation requires two variables of a 1-bit sign part and a 15-bit mantissa.

The floating-point representation can express numeric values in a wide range. In the case of 32 bits, numeric values can be expressed in a range of $2^{-127}$ to $2^{128}$ in absolute values since the exponent part is formed by eight bits. Accuracy of a numeric value expressed in this range is extremely varied with the value of the exponent part. Consider 32-bit numeric data having the aforementioned format. When the exponent part has a constant 8-bit value E0, the following numeric values Z0 can be expressed:

$$1.00 \cdot 2^{E0} \leq Z0 \leq (1.00+2^{-1}+2^{-2}+\ldots 2^{-23}) \cdot 2^{E0}$$

This value area includes $2^{23}$ numeric values, in expression accuracy (resolution) of $2^{E0}/2^{23}$. Namely, values of $2^{E0}$ to $2^{E0+1}$ are uniformly divided by the 23 bits of the mantissa in this value area, to express numeric values of this value area.

Namely, the resolution of the floating-point representation is varied with the value E0 of the exponent part, to be improved as the value E0 is decreased. When the value E0 is small, therefore, numeric values may be too finely expressed beyond necessity as compared with accuracy required by the system to which this representation is applied. In the floating-point representation, further, numeric operations may be extremely complicated since numeric expression is varied with the value of the exponent part, as described later again in detail.

In the fixed-point representation, on the other hand, the method of expressing numeric values is uniquely decided by decision of the maximum expressible value. Assuming that the maximum and minimum values in 16-bit representation are ±M0, the range between the maximum and minimum values M0 and −M0 is uniformly divided by 16 bits to express numeric values. Thus, the resolution is $2 \cdot M0/2^{16} = M0/2^{15}$. In this case, a range of expressible positive numeric values Z0 is as follows:

$$M0/2^{15} \leq 0 \leq M0$$

The fixed-point representation has such a disadvantage that the range of expressible numeric values is extremely limited, while the same has such an advantage that numeric values are regularly arranged on a number line at regular intervals of $M0/2^{15}$, to extremely facilitate arithmetic operations (addition, subtraction, multiplication and division).

A method of forming a lookup table for sigmoid functions is now described.

A method of implementing conversion with nonlinear functions such as sigmoid functions by a lookup table can be implemented through saturation characteristics of the sigmoid functions. Namely, it is possible to implement a lookup table by limiting a range extremely changing function values, storing the function values in this range in a memory with addresses of input variables and reading necessary values from the memory at any time.

As shown in FIG. 35, for example, function values of the sigmoid function f(x) are extremely varied in a narrow area of about $-8 \leq x \leq 8$, and the same can be approximated to zero or 1 in other ranges. Thus, the function values in the range of $-8 \leq x \leq 8$ may be stored in the memory. In this case, error values of the function values with respect to input values which are out of the range are not more than $3 \cdot 10^{-4}$, while such errors are not more than $1 \cdot 10^{-7}$ assuming that the variable area of input variables is $-16 \leq x \leq 16$. Thus, it is understood that nonlinear conversion processing is not extremely influenced by restriction of the variable area. Thus, the feature of the saturation nonlinear functions such as sigmoid functions resides in that the variable area can be restricted.

Generation of memory addresses in this lookup table method is now described, first with reference to fixed-point representation.

In the fixed-point representation, numeric values are uniformly arranged in a range between maximum and minimum values at intervals decided by the bit number of the mantissa. Therefore, input variables themselves can be regarded as addresses, such that the film potential data on the input data bus 993 are expressed in the fixed-point representation and supplied to the conversion table 994 shown in FIG. 37.

Consider 16-bit numeric values in fixed-point representation. Assuming that the variable area of input values of nonlinear functions is $-8 \leq x \leq 8$ and the range 16 is expressed in 14 bits (14-bit accuracy), the input values are varied at intervals of about 0.0009765 from $16/2^{14}$, whereby $2^{14}$ (=16384) addresses can be generated. When function values are expressed in 16 bits, therefore, it is possible to implement a lookup table for nonlinear conversion by employing a memory which can store $2^4 \cdot 2^{10}$ words (16K words), assuming that 1 word is formed by 16 bits. When the bit number of the mantissa is increased, the number of the addresses is also increased, to improve conversion accuracy. The feature of this method employing fixed-point representation resides in that addresses can be extremely readily generated since input values are uniformly digitized to be employed as addresses. However, an output value which corresponds to an input value between two adjacent addresses is rounded to an output value corresponding to any one of those provided on both sides of the input value.

Description is now made on address generation in a case of forming a lookup table through floating-point representation. A method of generating addresses of a lookup table from input values in floating-point representation requires more attention as compared with the aforementioned fixed-point representation.

First, description is made on how input values are expressed. The range $-8 \leq x \leq 8$ of input values described above with reference to the fixed-point representation is not uniformly divided in floating-point representation dissimilarly to the fixed-point representation, but divided as follows:

$$4 \leq x \leq 8 \tag{1}$$

As the exponent part E is constant at 2, this range is uniformly divided by 23 bits of the mantissa.

$$2 \leq x \leq 4 \tag{2}$$

As the exponent part E is constant at 1, this range is uniformly divided by 23 bits of the mantissa.

$$1 \leq x \leq 2 \tag{3}$$

As the exponent part E is constant at 0, this range is uniformly divided by 23 bits of the mantissa.

$$0.5 \leq x \leq 1 \tag{4}$$

As the exponent part E is constant at $-1$, this range is uniformly divided by 23 bits of the mantissa.

$$0.25 \leq x \leq 0.5 \tag{5}$$

As the exponent part E is constant at $-2$, this range is uniformly divided by 23 bits of the mantissa.

$$0.125 \leq x \leq 0.25 \tag{6}$$

As the exponent part E is constant at $-3$, this range is uniformly divided by 23 bits of the mantissa.

$$0.0625 \leq x \leq 0.125 \tag{7}$$

As the exponent part E is constant at $-4$, this range is uniformly divided by 23 bits of the mantissa.

$$\text{(continues similarly to the above)} \tag{8}$$

As described above, the feature of the floating-point representation resides in that a region where the value of the exponent part E is constant is uniformly divided by 23 bits of the mantissa. This range is $2^{n-1} \leq x \leq 2^n$ (n: integer). Therefore, the width of this range is increased as absolute values of input values are increased so that the intervals between the numeric values in this range are also increased with roughened accuracy, while the accuracy is refined as the absolute values of the input variables are decreased. Namely, accuracy is varied with the input values if the input values are utilized as addresses as such, and hence it is impossible to carry out correct conversion.

Consider that memory addresses are directly generated from 16 bits in total among 1 bit of the sign part, 8 bits of the exponent part and 9 bits of the mantissa in the numeric values of 32-bit floating point representation, for the purpose of comparison with a case of generating memory addresses in accordance with numeric values of 16-bit fixed-point representation. It is assumed that upper 9 bits are selected as the 9 bits of the mantissa, and the range of input variables is $-8 \leq x \leq 8$. When the variable area is expressed in 14 bits among 16 bits of fixed points, the accuracy is about 0.0009765, as described above.

In the case of the floating-point representation, on the other hand, numeric values in a range of $4 \leq x \leq 8$ are expressed in 9 bits of the mantissa, whereby $4/2^9 = 1/2^7$ and the accuracy is about 0.0078125. In a range of $0.125 \leq x \leq 0.25$, the accuracy is about 0.0002441 with $0.125/2^9$.

In the floating-point representation, therefore, the mantissa is inferior in accuracy to that of the fixed-point representation in a range having large numeric values, due to restriction of the bit number. In a range having small absolute values of input variables, on the other hand, the accuracy is improved as compared with that of the fixed-point representation, and this tendency is made remarkable as the absolute values of the input values are decreased. When the bit number of the mantissa is limited due to limitation of memory capacity in direct generation of addresses from numeric data of floating-point representation, the accuracy may be made inferior to that in the fixed-point representation depending on the variable area, and hence the advantage of high accuracy cannot be effectuated in the floating-point representation.

Now, consider that absolute values of input values are extremely small in direct generation of addresses from numeric data in floating-point representation. While it is possible to express small numbers up to that having an absolute value of $2^{-127}$ in floating-point representation, such small values are generally unnecessary in practice. When the sigmoid function f(x) has the shape shown in FIG. 35, for example, difference between function values with respect to $x=2^{-15}$ and $x=2^{-16}$ is about 0.0000038. Such small values are generally unnecessary as output values of nonlinear conversion required in application to a neural network or the like, in particular. Thus, most of input values ($2^{-15}$ to $2^{-127}$ in this example) expressed in floating-point representation are too fine in accuracy beyond necessity, and employment of these values as input values for a lookup table is extremely inefficient since these values merely bring increase of unnecessary function values.

When input values of nonlinear functions are employed as addresses of a memory provided in a lookup table in an arithmetic system employing floating-point representation, accuracy of the mantissa is limited due to limitation in memory capacity in consideration of integration as hereinabove described. Thus, the input values are extremely ununiformalized in accuracy and the availability of the memory is reduced due to unnecessary function values stored therein while unnecessary function values are also loaded in data storage of the conversion table. Thus, it is impossible to form an efficient lookup table for nonlinear conversion. Further, sufficient accuracy cannot be guaranteed depending on the range of input variable values, and hence nonlinear conversion cannot be correctly carried out.

In application, it may be possible to further efficiently or accurately carry out processing by converting numeric data in floating-point representation to those of fixed-point representation or vice versa. However, there has been disclosed no structure of efficiently converting the numeric data form in the prior art. Such adjustment of converting numeric data of different forms is required in a multiprocessor system provided with a plurality of compatible processors handling numeric data of different forms, for example.

SUMMARY OF THE INVENTION

An object of the present invention is to provide a nonlinear function generator which can efficiently carry out nonlinear conversion through a lookup table in an arithmetic system employing numeric data in floating-point representation.

Another object of the present invention is to provide a nonlinear function generator comprising functions of readily carrying out operations such as expansion, reduction and translation of nonlinear conversion functions.

Still another object of the present invention is to provide a nonlinear function generator which can efficiently carry out threshold conversion processing employed particularly in a neural network at a high speed.

A further object of the present invention is to provide a format converter which can convert forms of numeric data with each other.

A further object of the present invention is to provide a nonlinear function generator having a function of readily implementing generation of noise employed in a neural network and change in temperature of the neural network.

According to a first aspect of the present invention, a nonlinear function generator includes memory means which stores values of nonlinear functions for respective variables in a variable area having first constant accuracy with addresses of the respective variables. The nonlinear function values in the nonlinear function area form an output value area having second constant accuracy.

The nonlinear function generator according to the present invention further comprises input conversion means for converting input variables to be included in the variable area and generating addresses for the memory means, and output conversion means for converting output values read from the memory means to those of a value area and a form corresponding to the input variables.

According to a second aspect of the present invention, a nonlinear function generator comprises conversion means for adding at least exponent parts of predetermined values to input variables of fixed-point representation in a first value area and producing numeric data of floating-point representation included in a second value area, and means for subtracting predetermined offset values from the numeric data produced by the conversion means. The second value area having the exponent parts of predetermined values includes numeric values which are in one-to-one correspondence to those in the first value area. The predetermined offset values employed in the subtraction means are equal to differences between the numeric values in the second value area and the corresponding ones of the first value area.

According to a third aspect of the present invention, a nonlinear function generator comprises adder means for floating point-adding predetermined offset values to input variables expressed in floating point representation in a first value area, and extraction means for extracting numeric value data of mantissas included in output values of the adder means. The offset values indicate amounts of movement of the respective numeric values in the first value area which are translated into the second value area. The numeric values expressed in floating-point representation in the second value area have exponent parts of the same values.

In the first aspect of the present invention, variables of a variable area having constant accuracy are stored in the memory means of corresponding nonlinear function values as addresses. The value area of the nonlinear function values has constant accuracy. Thus, only necessary function values are stored in the memory means in necessary accuracy, whereby an efficient nonlinear conversion table can be formed. Further, the input conversion means converts the input variables to be included in a variable area corresponding to respective numeric values stored in the memory means for generating addresses for the memory means while the output conversion means converts function values read from the memory means to a value area and a form corresponding to the input variables, whereby it is possible to readily generate nonlinear function values corresponding to any input variables.

In the second aspect of the present invention, exponent parts are added to the inputted variables of fixed-point representation to produce numeric value data of floating-point representation included in the second value area and the prescribed offset values are subtracted from the numeric value data as produced so that the results are returned to the value area of the input variables, whereby it is possible to readily convert numeric values of fixed-point representation to those of floating-point representation.

In the third aspect of the present invention, numeric data of mantissas are extracted after offset values are added to inputted variables of floating-point representation. The input variables are moved by the adder means into a value area with a constant value of the exponent parts. In a region where the values of the exponent parts are constant, the variables are arranged in accuracy which is decided by bit numbers of the mantissas. Thus, it is possible to obtain numeric values of fixed-point representation by extracting the values of the mantissas.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 illustrates truth values of input/output signals of the selection signal output circuit shown in FIG. 15;

DESCRIPTION OF THE PREFERRED EMBODIMENTS

Before explaining embodiments of the present invention, the principle operation of nonlinear conversion processing in the present invention is now described.

Figure 1:
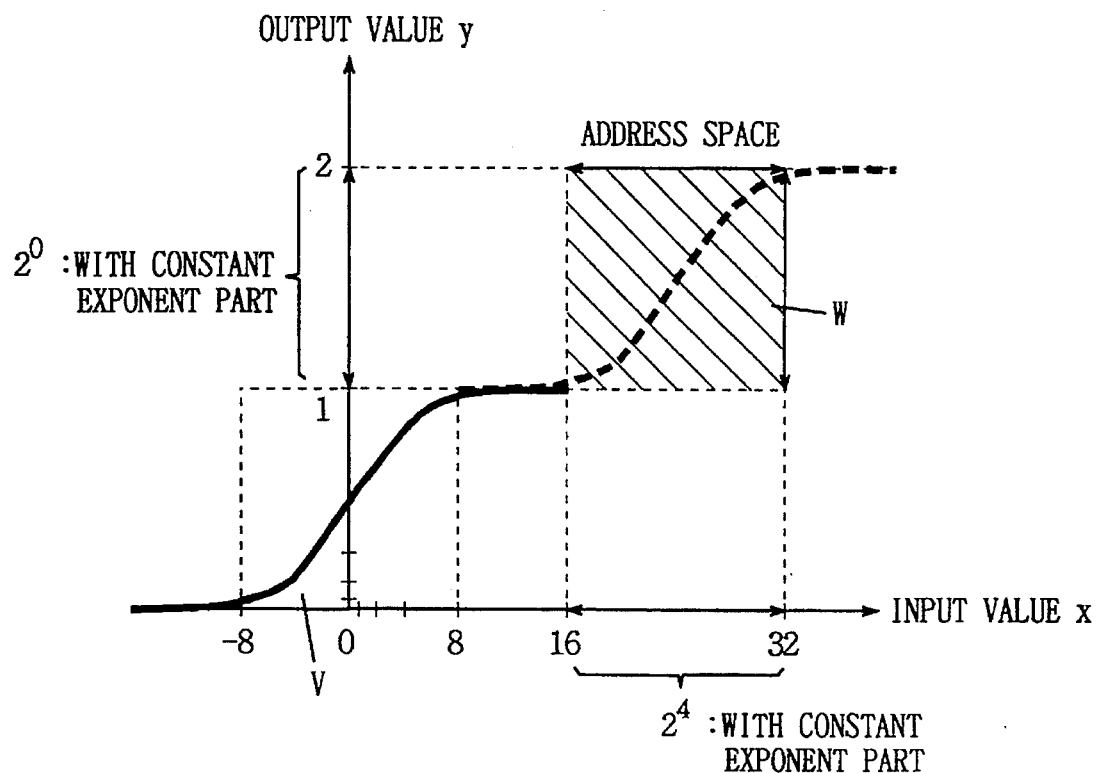
FIG. 1 is a diagram for illustrating the operation principle of a nonlinear function generator according to the present invention.
Figure 2:
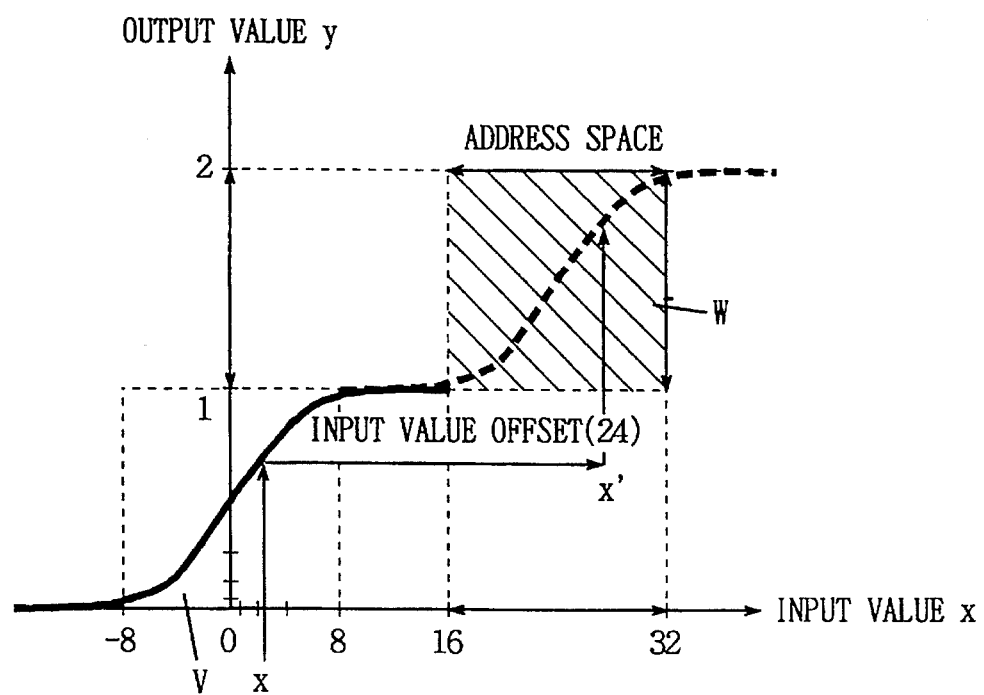
FIG. 2 is a diagram for illustrating the operation principle of the nonlinear function generator according to the present invention.
Figure 35:
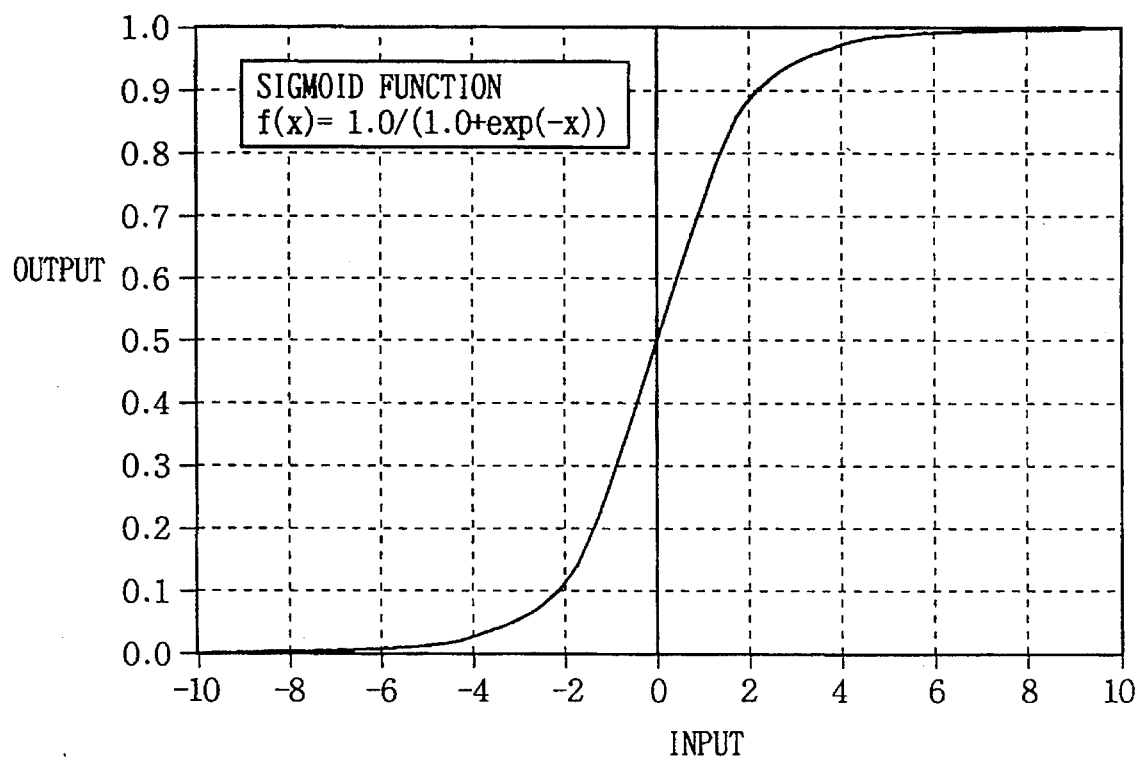
FIG. 35 illustrates an exemplary nonlinear function employed for neuron threshold conversion processing.
Figure 36:
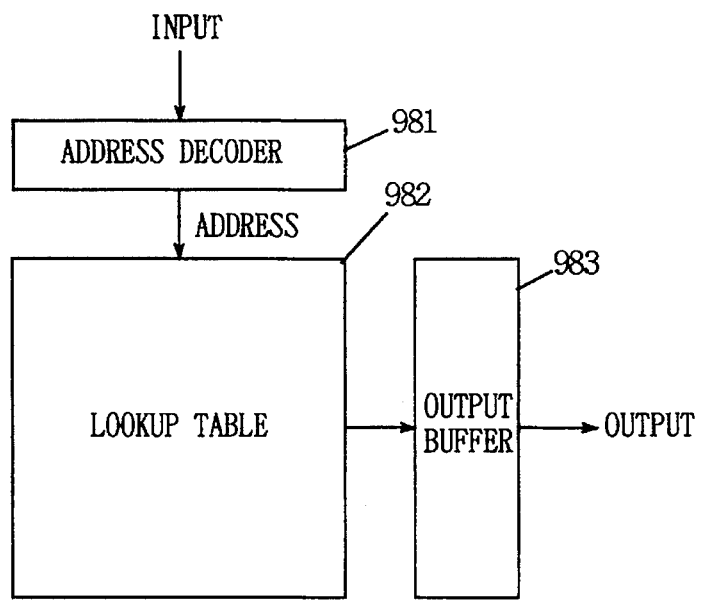
FIG. 36 is a diagram for illustrating a conventional lookup table.
Figure 37:
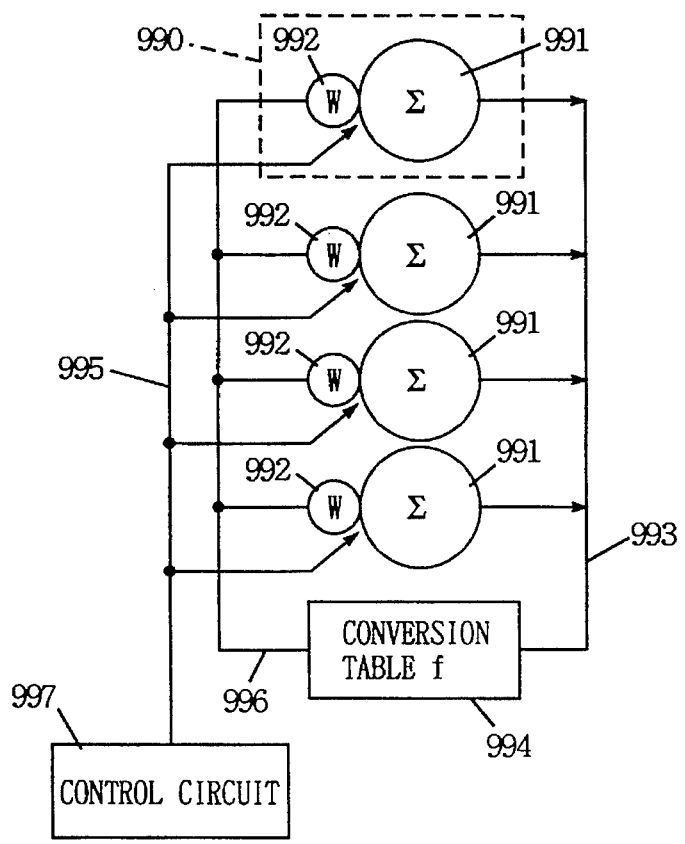
FIG. 37 illustrates an exemplary structure of a conventional neural network carrying out nonlinear conversion processing in accordance with a lookup table system.
Figure 38:
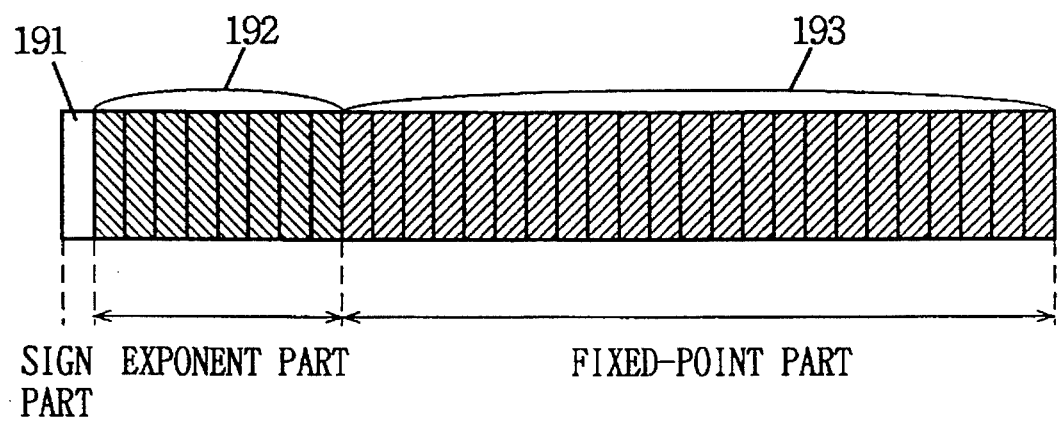
FIG. 38 illustrates a format of numeric data of floating-point representation.
Figure 39:
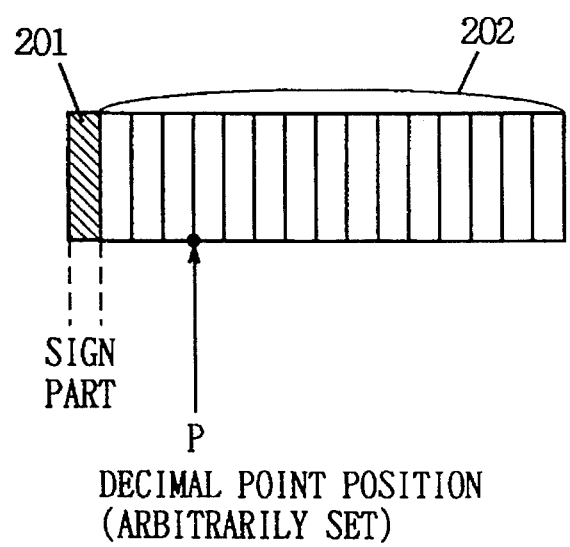
FIG. 39 illustrates a format of numeric data of fixed-point representation.

According to the present invention, a nonlinear conversion circuit employing a lookup table is efficiently implemented in an arithmetic system employing numeric data of floating-point representation. The nonlinear conversion circuit carries out the following operation:

The circuit adds offset values to input and output values x and y of floating-point representation in relation to a desired nonlinear function y=f(x), where y and x represent output and input values respectively, and translates the nonlinear function to a region where values of exponent parts of the values x and y are constant. Consider a range of the output value y of $0 \leq y \leq 1$, assuming that the input value x is in a range of $-8 \leq x \leq 8$ with reference to the sigmoid function shown in FIG. 35, for example. The range width of the input value x is 16, and the value of the exponent part is constant in a range of $2^4$ to $2^5$ since $16=2^4$. Namely, the value of the exponent part is constant in a range of $16 \leq x \leq 32$. Also as to the output value y, the width is 1 and the value of the exponent part is constant in a range of $2^0$ to $2^1$, from $1=2^0$. Therefore, the output value y is set in a range of $1 \leq y \leq 2$. Namely, a region V is shifted by 24 and by 1 along directions x and y as shown in FIG. 1, to obtain a region W. Function values in the region W shown in FIG. 1 are stored in a memory. The memory stores only values of mantissas of the function values in necessary bit accuracy (16 bits, for example). The bit numbers of memory addresses are decided in accordance with accuracy of nonlinear conversion processing. In a range where the values of exponent parts are constant, numeric values are arranged at constant intervals regardless of floating-point representation. Thus, input values are uniformly divided and arranged in constant accuracy. The memory is accessed in the following manner:

As shown in FIG. 2, an offset value is floating point-added to an input value x. This offset value, which is an amount of displacement between input values of the regions W and V, is 24 in the shown example. If an offset input value x' is present in the region W, necessary upper bits are extracted from the mantissa of the offset input value x', to be employed as addresses of the memory. The number of the bits extracted from the mantissa of the offset input value x' is decided by the accuracy required for the nonlinear conversion processing. If the offset input value x' is not present in the region W, the least or most significant address of the memory is supplied to the memory to read a corresponding function value. If the offset input value x' is greater than 32, for example, a greated address storing a function value 1 is generated. If the offset input value x' is less than 16, on the other hand, a smallest address storing a function value 0 is generated.

Figure 3:
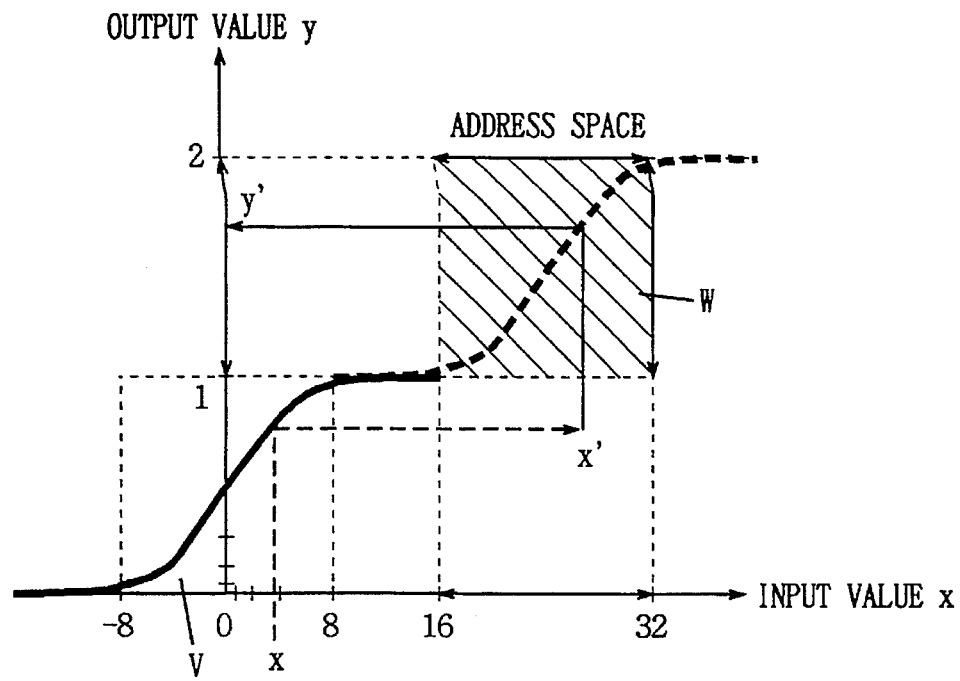
FIG. 3 is a diagram for illustrating the operation principle of the nonlinear function generator according to the present invention.
Figure 4:
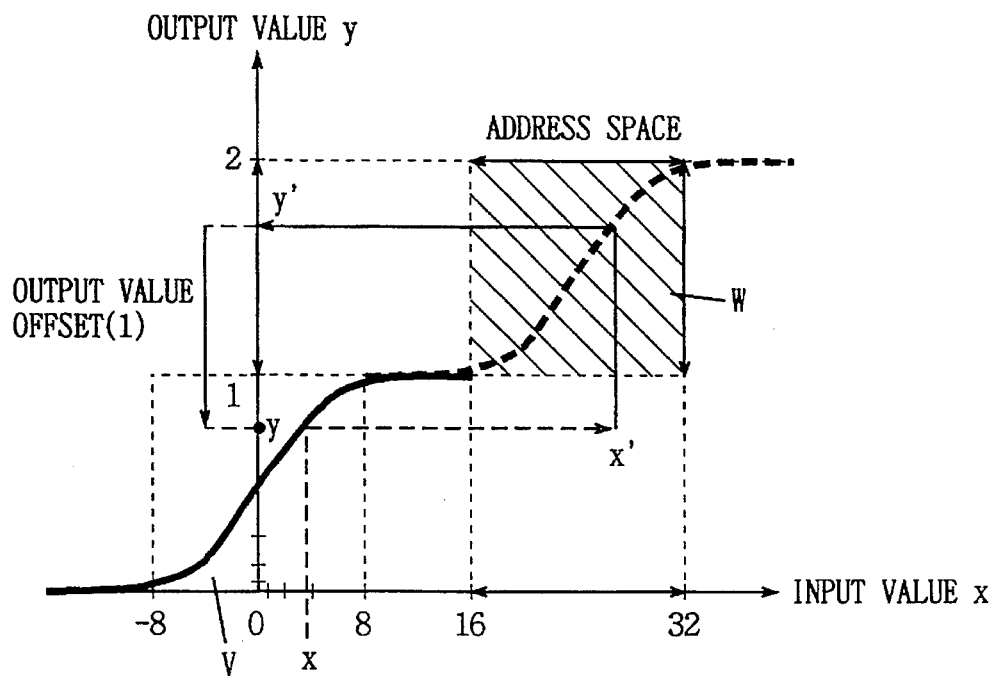
FIG. 4 is a diagram for illustrating the operation principle of the nonlinear function generator according to the present invention.

An output value which is read from the memory has only a value of the mantissa. In this case, the value and the sign of an exponent part of the region W are constant, and hence the constant sign and exponent part are added to the function value as read while zeros are added to lower bits of the mantissa for correction to floating-point representation with bit expansion. The number of zeros which are added to the mantissa is decided by the bit number of the function values stored in the memory and that of the mantissa required by the format of the output value y. Due to the bit expansion operation, an output value y' is obtained in floating-point representation, as shown in FIG. 3. This output value y' is included in the region W, and an output value offset (1) is subtracted from this output value y' as shown in FIG. 4, in order to convert the same to a corresponding value in the region V. Thus, a final output value y is obtained.

In nonlinear conversion required in a neural network, which is a typical example to which the present invention is applied, accuracy of about 16-bit fixed-point representation is sufficient in general. However, this does not mean that the overall neural network may sufficiently carry out operations through numeric data of fixed-point representation. When all processing is carried out in floating-point representation in nonlinear conversion processing, this leads to unnecessary increase of accuracy with inefficient increase in arithmetic operation time. As hereinabove described, therefore, input/output operations for nonlinear conversion processing can be carried out in floating-point representation and only nonlinear conversion can be handled in fixed-point representation, whereby conversion processing can be carried out at a high speed in necessary and sufficient accuracy.

Now, consider that a variable area, or an area of variable values in which function values are effectively changed is set as $-8 \leq x \leq 8$ in a value area $0 \leq f(x) \leq 1$ of the sigmoid function. As to input values which are out of this range, it is assumed that $f(x)=0$ in case of $x \leq -8$, and $f(x)=1$ in case of $8 \leq x$. An output value truncation error resulting from the limitation of the variable area is not more than about 0.0004 (about 12-bit accuracy), and this variable area limitation is appropriate in consideration of errors.

When the variable area and the value area of the function are expressed in floating point values, exponent parts are changed and accuracy is improved as the absolute values of numeric values are reduced, as hereinabove described. However, extremely high accuracy is unnecessary for most application examples and leads to inferior operation efficiency, and hence about 16-bit accuracy is sufficient as described above. When the variable area and the value area of the function are translated to the region W where the exponent part is constant as shown in FIG. 1, therefore, expression accuracy of the nonlinear functions is decided by only accuracy of the mantissa of the variable area and the value area.

In the region W after translation or shifting, the variable area is moved to $16(=2^4) \leq x \leq 32(2^5)$, and the value area is moved to $1(=2^0) \leq f(x) \leq 2(2^1)$. In each of the variable and value areas, only the value of the mantissa is changed while the value of the exponent part remains constant. Thus, only the values of the mantissas are linearly changed in both of the variable and value areas, thereby substantially implementing fixed-point representation while maintaining floating-point representation. Since the values of the exponent parts are constant, only the values of the mantissas are significant information. In order to form a lookup table, only values of mantissas of output values are stored in the memory in accordance with required accuracy, while employing offset input values as addresses. When both of input and output values are 16-bit data, it is possible to store all required function values in a memory of $16 \cdot 2^{16}=1$ Mbits in storage capacity, thereby forming a lookup table for nonlinear conversion with a memory having a practical scale.

Due to employment of such a lookup table, it is possible to form a table for nonlinear conversion without damaging floating-point representation. This method is applicable to nonlinear functions of any shapes in principle. The present invention is applicable to all saturated nonlinear functions. The present invention is also applicable to step functions having output values taking only zero and 1.

The present invention is further applicable to functions called mother wavelet or analyzing wavelet functions recently employed for wavelet conversion in the field of signal analysis or picture coding, and localized nonlinear functions employed for Gabor functions (conversion) in a neuron model which is modelled on the response of receptive fields of cells to photic stimulation. The present invention is further applicable to a radial basis function which is similar to a potential function of charged particles employed for a stochastic pattern classifier or the like. Namely, the present invention is applicable to arbitrary functions generating significant output values in a finite range of input values.

[Embodiment 1]

Figure 5:
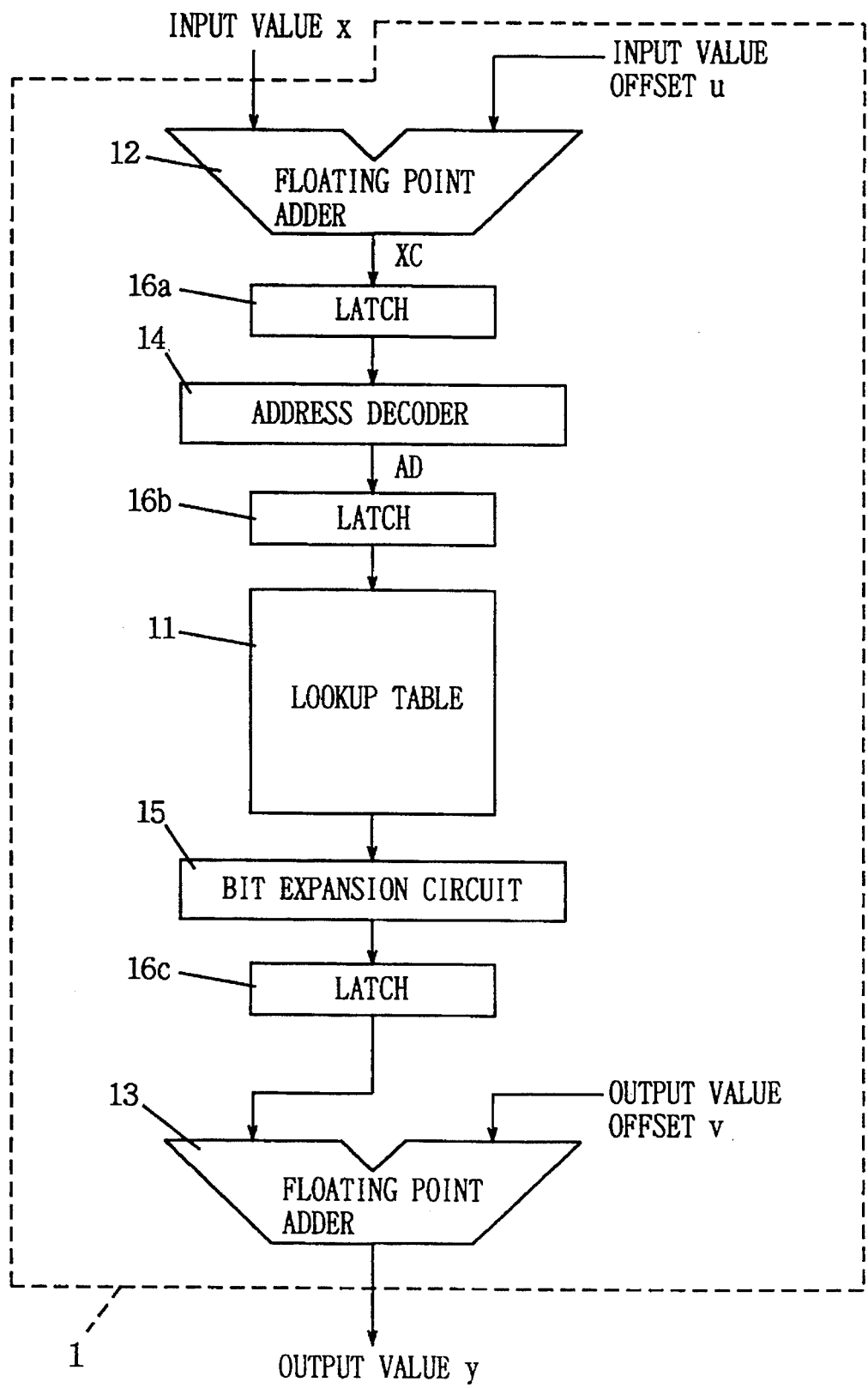
FIG. 5 illustrates the structure of a nonlinear conversion circuit according to a first embodiment of the present invention.

FIG. 5 illustrates the structure of a nonlinear conversion circuit 1 according to a first embodiment of the present invention. Referring to FIG. 1, the nonlinear conversion circuit 1 includes a lookup table 11 storing necessary nonlinear function values, a floating point adder 12 for floating point-adding up an input value x of floating-point representation and a prescribed input value offset u, an address decoder 14 for generating an address for the lookup table 11 along an output of the floating point adder 12, a bit expansion circuit 15 bit-expanding an output value of the lookup table 11 for generating floating-point representation data of a prescribed format, and a floating point adder 13 for floating point-adding up (subtracting) an output value of the bit expansion circuit 15 and a prescribed output value offset v.

As to the nonlinear function values stored in the lookup table 11, a prescribed offset value is previously added to input/output values. When a region where function values of the nonlinear functions stored in the lookup table 11 are substantially changed is expressed in floating-point representation, its exponent part is made constant over the region. When a variable area thereof is also expressed in floating-point representation, its exponent part is constant over the entire variable area. The offset value is assumed to be positive in the following description for the purpose of simplification, it is also possible to provide a negative offset value. A memory forming the lookup table 11 stores bits in a number satisfying accuracy which is necessary for mantissas of its output values (function values) as 1 word. The number of words is decided by accuracy which is required for variable areas of functions. When an output value has 8-bit accuracy with resolution of $½^8$ and the memory stores data of 1024 words corresponding to upper 10 bits of a mantissa of an input value, it is possible to store all necessary function values in a memory having storage capacity of 8 bits×1K words.

The floating point adder 12 adds the offset value to the input value x, for implementing translation to a region having constant values of exponent parts. Namely, a variable area in which function values of nonlinear functions are substantially changed is converted to a region having constant exponent parts by the adding operation of the floating point adder 12. Only values of mantissas are changed in input values included in the converted region. Namely, numeric values are linearly changed at constant intervals in the converted region.

The address decoder 14, the structure of which is described later in detail, compares the value of the exponent part of the input value XC converted by the floating point adder 12 with that of an exponent part in the variable area of data stored in the lookup table 11, to generate an address for the lookup table 11 in accordance with the result of the comparison. When the comparison result exhibits matching, the address decoder 14 cuts out bits of a number corresponding to that of the words stored in the lookup table 11 from upper bits of the mantissa of the numeric data XC received from the floating point adder 12, to generate an address AD for the lookup table 11. When the comparison result exhibits mismatching, on the other hand, the address decoder 14 outputs the maximum or minimum value of the address for the lookup table 11. The maximum value of "1" is stored, for example, in a maximum address position, while the minimum value of "0" is stored, for example, in a minimum address position. Either the maximum or minimum address is selected in response to the values of the exponent parts of the numeric value outputted by the floating point adder 12 and the variable area of the data stored in the lookup table 11.

Data (function value) read from the lookup table 11 includes only data of a mantissa of the function expressed in floating-point representation. Lower bits of the mantissa are truncated in response to required accuracy. The bit expansion circuit 15 adds sign data (flag), exponent part data and lower bits of the mantissa to the data read from the lookup table 11, to generate a function value of floating-point representation in a format similar to that of the input value x. The exponent part which is bit-expanded in the bit expansion circuit 15 is equal to that of the exponent part of the output offset value added in storage of the data (function value) in the lookup table 11. In bit expansion of lower bits of the mantissa, data "0" is simply added to the lower bits. As to the sign flag, all function values have the same sign, and are constant.

The floating point adder 13 subtracts the offset value having been added to the function values stored in the lookup table 11 from the data bit-expanded by the bit expansion circuit 15. Due to the floating point subtraction operation of the floating point adder 13, the output of the bit expansion circuit 15 is converted to a truth value of the target nonlinear function. The floating point adder 13 outputs a final output value y of floating-point representation.

Latches 16a, 16b and 16c which are provided between the floating point adder 12 and the address decoder 14, between the address decoder 14 and the lookup table 11, and between the bit expansion circuit 15 and the floating point adder 13 are adapted to perform latch operations in synchronization with clock signals (system clocks, for example) respectively, thereby carrying out processing in the nonlinear conversion circuit 1 in a pipeline manner. It is possible to execute conversion processing at a high speed, by carrying out the processing in a pipeline manner.

Figure 6:
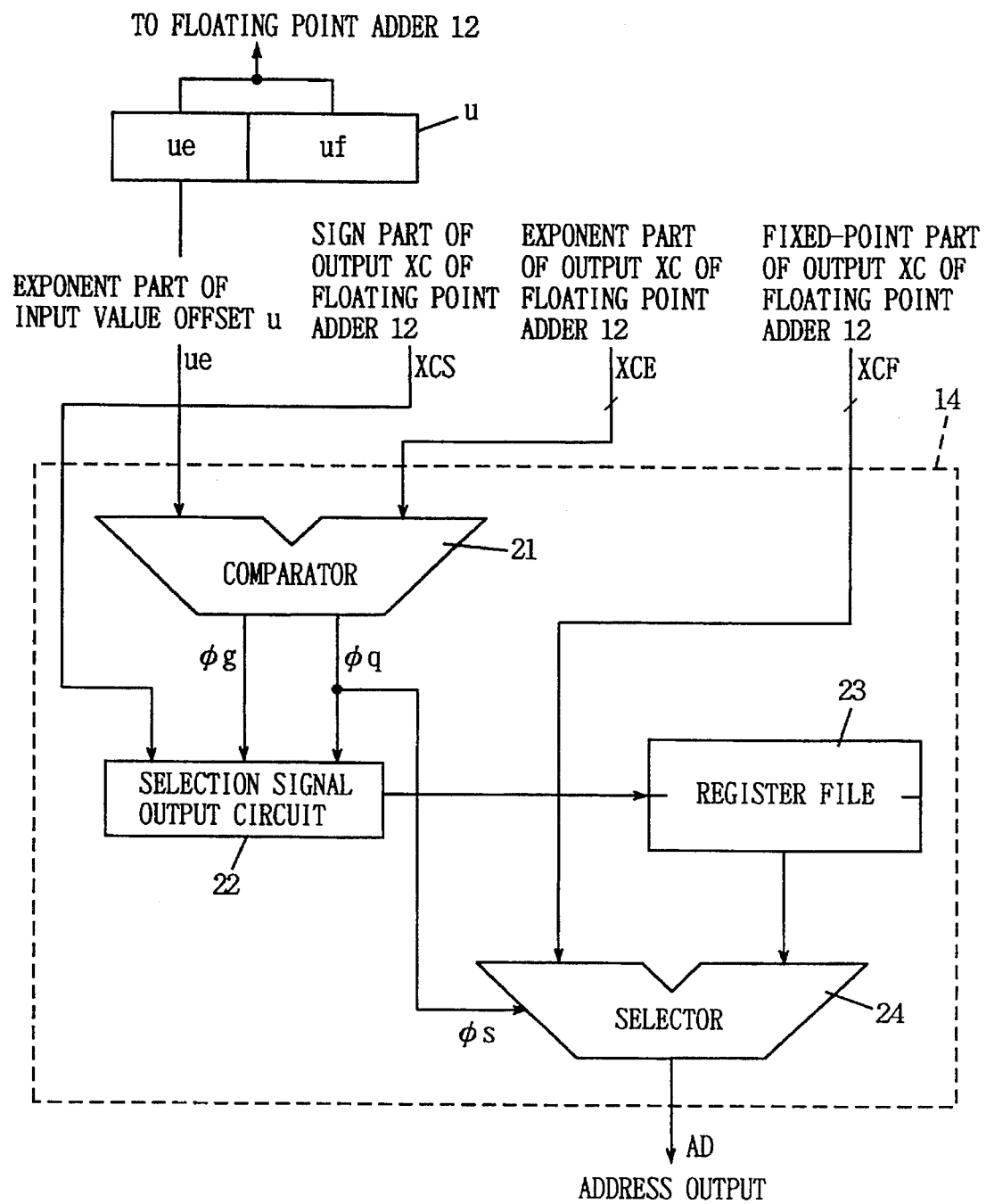
FIG. 6 schematically illustrates the structure of an address decoder shown in FIG. 5.

FIG. 6 illustrates an exemplary structure of the address decoder 14 shown in FIG. 5. Referring to FIG. 6, the address decoder 14 includes a comparator 21 which compares exponent part data ue of the input value offset u with exponent part data XCE of the output XC from the floating point adder 12 for outputting signals φg and φq indicating large-small relation and equality respectively in accordance with the comparison result, a selection signal output circuit 22 which generates a signal indicating which one of maximum and minimum addresses stored in a register file 23 is selected in accordance with the output signals φg and φq of the comparator 21 and sign part data XCS of the output XC of the floating point adder 12, and a selector 24 which receives the output signal φq of the comparator 21 as a selection signal φs for selecting one of mantissa data XCF of the output XC of the floating point adder 12 and an address outputted from the register file 23.

The exponent part data ue of the input value offset u is generated from the input value offset u which is supplied to the floating point adder 12. The input value offset u may be supplied in the conversion operation from a control circuit (not shown) which is provided in the exterior, or may be previously written in a register included in the nonlinear conversion circuit 1 so that the input value offset data stored in the register is outputted under control by an external controller (not shown) at need. This structure also applies to generation of the output value offset v.

When the exponent part data ue of the input value offset u is equal to the exponent part data XCE of the output XC of the floating point adder 12, the comparator 21 brings the output signal φq into an active state ("1"). When the exponent data ue of the input value offset u is greater than the exponent part data XCE of the output XC of the floating point adder 12, on the other hand, the comparator 21 brings the output signal φg into a state "1".

When the sign part data XCS indicates positive and the output signals φg and φq of the comparator 21 indicate that the exponent part data ue of the input value offset u is greater, the selection signal output circuit 22 generates a signal for selecting the minimum address with respect to the register file 23. When the output signal φq of the comparator 21 indicates equality, on the other hand, the selection signal output circuit 22 generates a signal for selecting an arbitrary single address of the register file 23 (minimum address is selected in this embodiment). When the output signals φg and φq of the comparator 21 indicate that the exponent part data ue of the input value offset u is smaller (both signals are "0"), further, the selection signal output circuit 22 generates a signal for selecting the maximum address with respect to the register file 23 (when the sign part data XCS indicates positive). When the sign part data XCS indicates negative, on the other hand, the selection signal output circuit 22 generates a signal, in a manner reverse to the above. The sign part data XCS is supplied to the selection signal output circuit 22, also in consideration of such a case that the variable range of the function values stored in the lookup table 11 is negative.

When the signal φq (φs) generated from the comparator 21 indicates equality, the selector 24 selects the mantissa data XCF supplied from the floating point adder 12 and outputs the address AD for the lookup table 11. When the output signal φq (φs) from the comparator 21 indicates inequality, on the other hand, the selector 24 selects an address which is read from the register file 23. The maximum address is (11 ... 1), and the minimum address is (00 ... 0), for example.

The address AD outputted from the selector 24 may have a bit number which is smaller than that of the mantissa of the input value x (truncation of lower bits). Such bit truncation for the mantissa may be executed in the initial stage floating point adder 12, or in the selector 24 shown in FIG. 6. In the floating point adder 12, the bit truncation for the mantissa may be carried out in its input part or in its output part.

Figure 7:
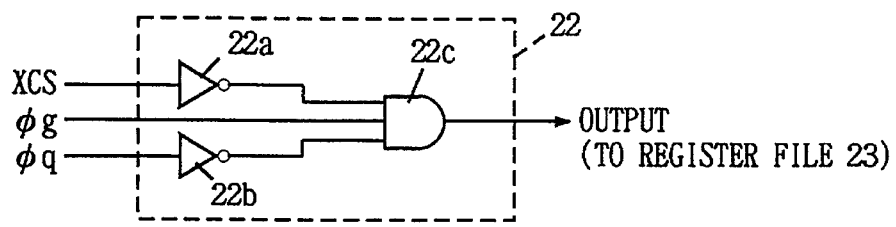
FIG. 7 illustrates an exemplary structure of a selection signal output circuit shown in FIG. 6.

FIG. 7 illustrates an exemplary structure of the selection signal circuit 22 shown in FIG. 6. Referring to FIG. 7, the selection signal output circuit 22 includes an inverter circuit 22a which receives the sign part data XCS, an inverter 22b which receives the output signal φq of the comparator 21, and a 3-input AND circuit 22c which receives outputs of the inverters 22a and 22b and the output signal φg of the comparator 21.

The sign part data XCS is 1 for a negative case, and 0 for a positive case. When the signal φg is "1", the exponent part data XCE of the offset input variable is greater than the exponent part data ue of the input value offset u. At this time, the signal φq indicating equality is "0". When the sign part data XCS is "0" indicating positive, therefore, the AND circuit 22c outputs a signal of "1", to select the maximum address which is stored in the register file 23. When both of the signals φg and φq are "0", on the other hand, the exponent part data XCE of the offset input variable is less than the exponent part data ue of the input value offset u. In this case, the AND circuit 22c outputs "0", to select the minimum address which is stored in the register file 23 (when the sign part data XCS is "0" indicating positive). When the sign part data XCS is "1" indicating negative, on the other hand, the inverter 22a outputs "0".

The structure of inverting the logic of the signal which is transmitted to the register file 23 in response to the negative/ positive value of the sign part data XCS can be implemented by an AND circuit receiving the signal φg at its one input and receiving the inverted signal φq at its another input, and a 2-input EXOR circuit receiving an output of the AND circuit and the sign part data XCS. In this case, the EXOR circuit operates as a buffer when the sign part data XCS is "0" indicating positive, while the same functions as an inverter circuit when the sign part data XCS is "1" indicating negative. Thus, it is possible to change the selected address in this case.

Figure 8:
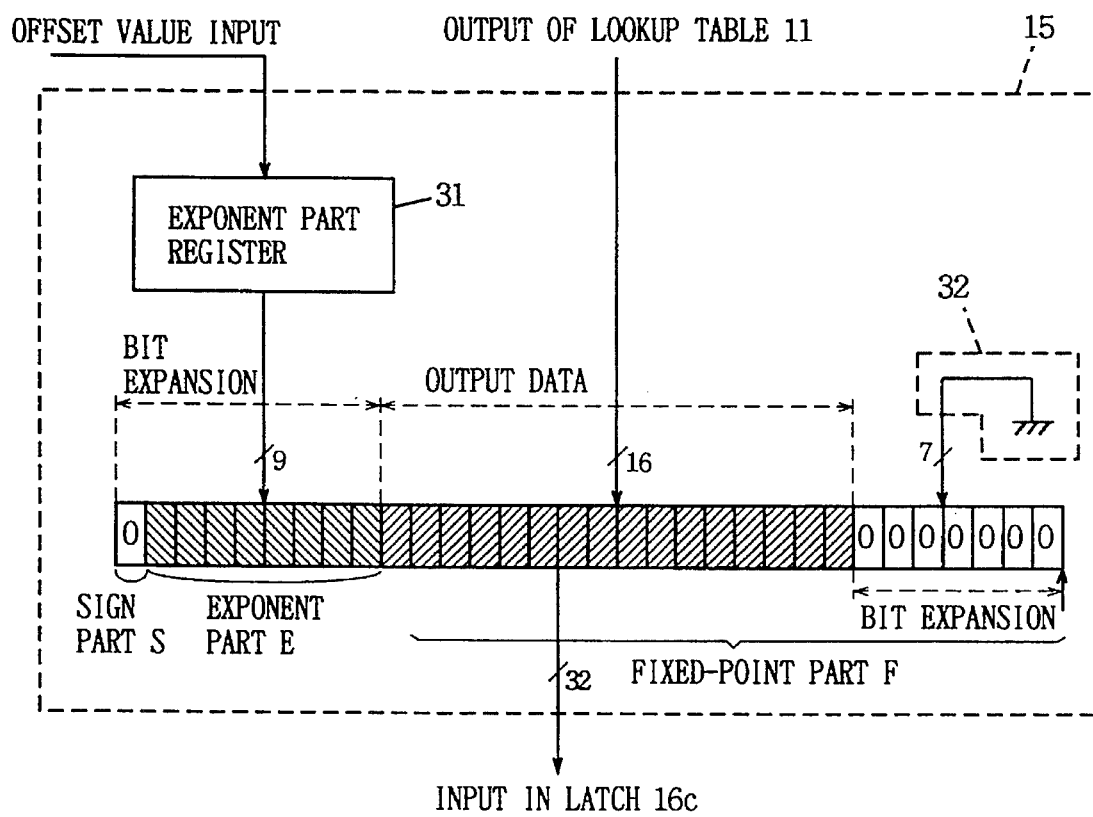
FIG. 8 illustrates an exemplary structure of a bit expansion circuit shown in FIG. 5.

FIG. 8 illustrates an exemplary structure of the bit expansion circuit 15 shown in FIG. 5. Referring to FIG. 8, the bit expansion circuit 15 includes an exponent part register 31 storing data of sign and exponent parts of the offset value which is added to the data (function values) stored in the lookup table 11, and a zero generation circuit 32 for expanding lower bits of the mantissa. FIG. 8 shows such an exemplary structure that the lookup table 11 outputs 16-bit data, which is bit-expanded to a 32-bit format having a mantissa F of 23 bits, an exponent part E of 8 bits and a sign part S of 1 bit. The zero generation circuit 32 generates a ground potential (corresponding to logic "0"), to set 7 lower bits of the mantissa F at "0".

In the bit expansion circuit 15, bit expansion processing may be carried out through such a structure that output values of the exponent part register 31 and the zero generation circuit 32 are temporarily stored in a latch circuit (not shown) with output data of the lookup table 11 and thereafter transmitted to the next-stage latch 16c. Alternatively, only a structure of simply expanding a data bus width may be employed.

The exponent part register 31 may be supplied with an offset value from an external controller (not shown), or a register provided in the nonlinear conversion circuit 1 for storing an output value offset. The data of the sign part S is set at "0", since a function value area is translated to a positive region.

Data of floating-point representation outputted from the bit expansion circuit 15 has a value obtained by adding up a finally obtained nonlinear function value and an offset value added for storing the function value in the lookup table 11.

As shown in FIG. 8, it is possible to readily convert a function value which is read from the lookup table 11 to numeric data of floating-point representation with no complicated processing.

Figure 9:
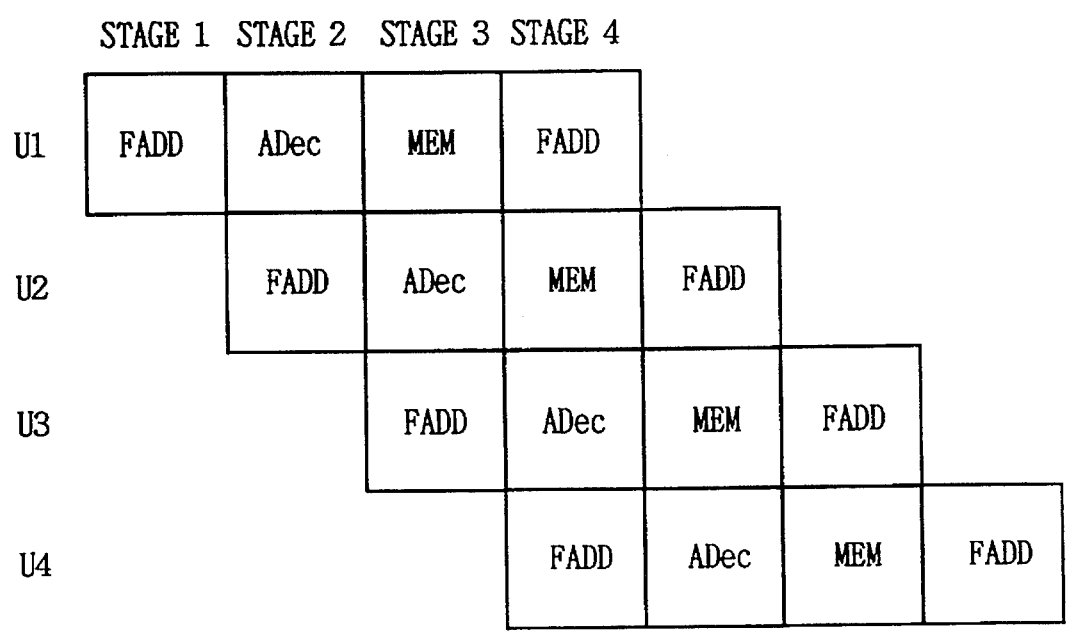
FIG. 9 is a diagram for illustrating a pipeline operation of the nonlinear conversion circuit shown in FIG. 5.

FIG. 9 illustrates a processing flow through the latch circuit shown in FIG. 5. The latches 16a, 16b and 16c shown in FIG. 5 operate in synchronization with clock signals which are system clocks, for example, to latch and output supplied data. Thus, the nonlinear conversion circuit 1 shown in FIG. 5 includes four pipeline stages, i.e., a stage 1 carrying out an offset operation for translating an input value, a stage 2 for generating an address from the offset input value, a stage 3 for reading a corresponding function value from the lookup table 11 and carrying out bit expansion in accordance with the address as generated, and a stage 4 for again offsetting the bit-expanded data for generating a final function value to be obtained. Referring to FIG. 9, symbols FADD, ADec and MEM denote operations carried out in the respective stages. Symbol FADD represents floating-point adding operations, including operations of subtraction by offset value. Symbol ADec represents address decoding operations for generating the address for the lookup table 11. Symbol MEM represents operations of reading corresponding data from the lookup table 11 for carrying out bit width expansion.

FIG. 9 illustrates an exemplary processing flow for four input values U1, U2, U3 and U4. When the input value U4 is supplied, all stages operate to carry out processing in the subsequent procedure, whereby it is possible to execute nonlinear conversion at a high speed. In this pipeline processing, the respective pipeline stages are independent of each other, with no data dependency between the stages. Therefore, no pipeline hazard is caused and the pipeline processing can be executed at a high speed with no blank in the pipeline.

According to the first embodiment of the present invention, as hereinabove described, a nonlinear function is so translated that values of exponent parts of variable and value areas thereof are constant and stored in the memory. Therefore, it is possible to form a lookup table by storing function values in the memory with addresses of input variables, thereby implementing a lookup table which is substantially similar to that of fixed-point representation while maintaining floating-point representation and obtaining an efficient lookup table. Further, the operation carried out in conversion processing is only a floating point adding/subtracting operation which is required for translating an input/output value in correspondence to translation of the function, whereby nonlinear conversion can be efficiently executed at a high speed. Further, it is possible to carry out nonlinear conversion in a pipeline manner by providing latches in respective stages, thereby executing the processing at a high speed.

[Embodiment 2]

Figure 10:
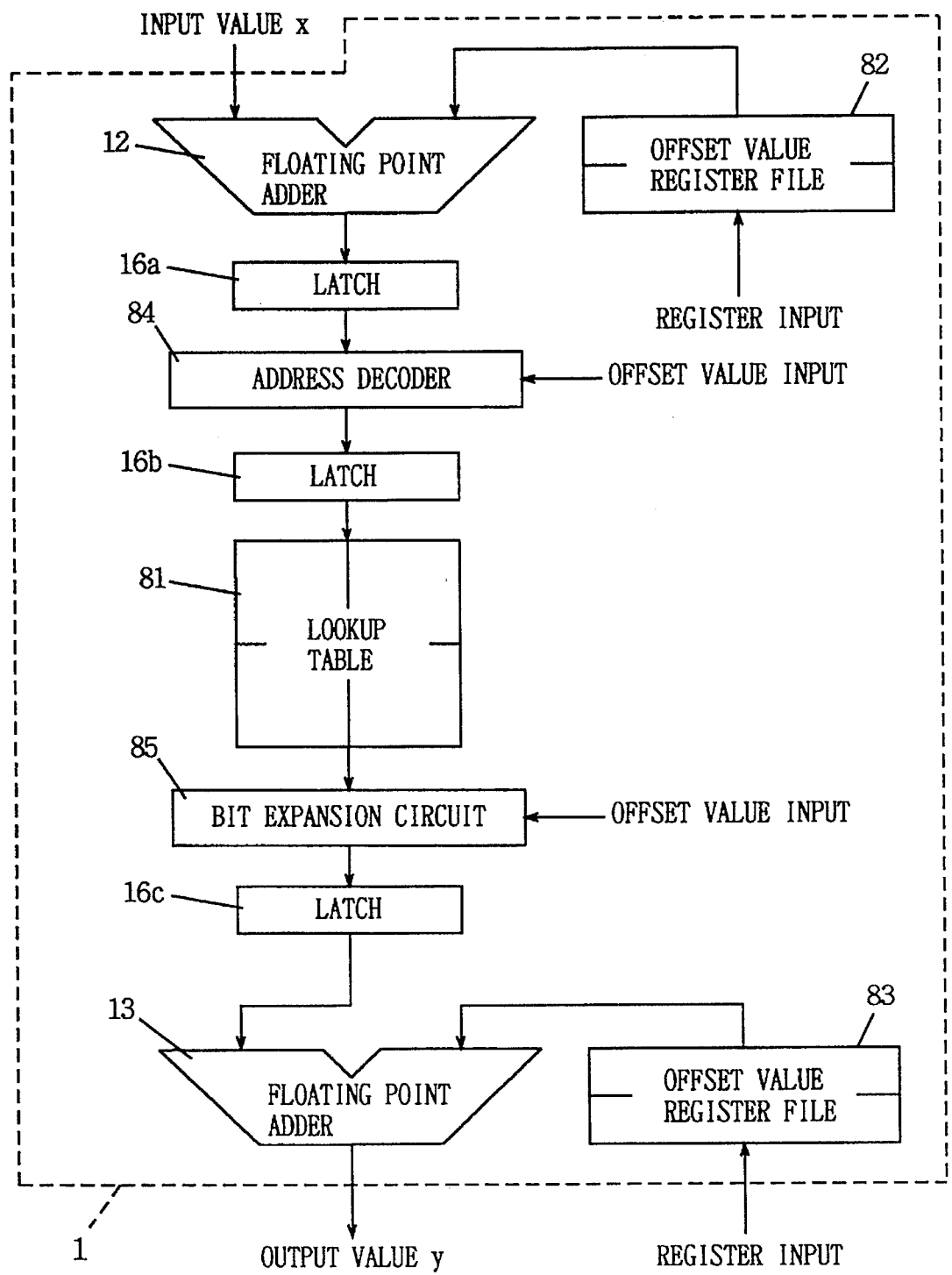
FIG. 10 illustrates the structure of a nonlinear conversion circuit according to a second embodiment of the present invention.

FIG. 10 schematically illustrates the structure of a nonlinear conversion circuit according to a second embodiment of the present invention. The basic structure of the nonlinear conversion circuit according to the second embodiment is similar to that of the first embodiment shown in FIG. 5.

A specific feature of the nonlinear conversion circuit according to the second embodiment shown in FIG. 10 resides in that a memory region of a lookup table 81 is divided into a plurality of partitions, so that values of different nonlinear functions are stored in the respective partitions. In order to generate offset values (amounts of translation or shifting) for the plurality of nonlinear functions, register files 82 and 83 are provided for generating offset values for an input value x and an output of a bit expansion circuit 85 respectively. An address decoder 84 for generating addresses for the lookup table 81 is slightly different in structure from that in the first embodiment, since the same generates addresses corresponding to respective variable areas of the plurality of nonlinear functions. Similarly, the bit expansion circuit 85 is also slightly different in structure from that of the first embodiment, since the same carries out bit expansion in correspondence to respective value areas of the plurality of nonlinear functions, as described later. Also in this embodiment, it is assumed that all offset values are positive for the purpose of simplification, while the following description is also applicable to negative offset values.

The register files 82 and 83 store externally supplied offset values in prescribed positions. In operation, necessary offset values are read from the register files 82 and 83 under control signals received from the exterior, and supplied to corresponding floating point adders 12 and 13 respectively. Values of exponent parts of the offset values which are read from the register files 82 and 83 are supplied to the address decoder 84 and the bit expansion circuit 85 respectively.

In a nonlinear conversion processing operation, nonlinear functions are specified by control signals received from an external controller, so that offset values are generated for the specified nonlinear functions. This nonlinear conversion processing operation is substantially identical to that of the nonlinear conversion circuit 1 according to the first embodiment shown in FIG. 5. The second embodiment is extremely different from the first embodiment only in a point that the nonlinear functions to be processed are changeable.

Figure 11:
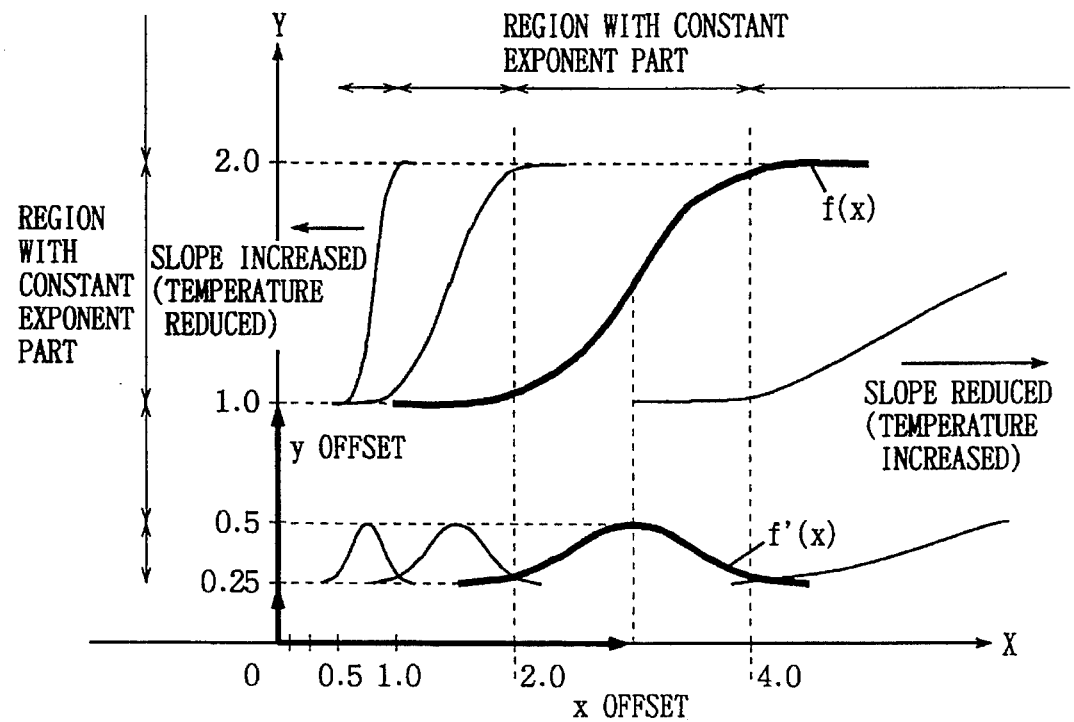
FIG. 11 illustrates exemplary shapes of nonlinear functions stored in a lookup table shown in FIG. 10.

FIG. 11 illustrates exemplary nonlinear functions which are stored in the lookup table 81. Referring to FIG. 11, a sigmoid function f(x) and its differential coefficient f'(x) are shown with function slopes. The sigmoid function f(x) is frequently used for deciding output states of neurons in a neural network, as described above. The differential coefficient f'(x) is frequently used in error back propagation learning in the neural network. In the error back propagation learning, synapse load values are generally corrected in accordance with the following equations:

$$\delta i = (ti - Si) \cdot f'(Ui) : \text{OUTPUT LAYER}$$

$$\delta i = \sum_j (Wij \cdot Sj) \cdot f'(Ui) : \text{INTERMEDIATE LAYER}$$

$$\Delta Wij = \alpha \cdot \Delta Wij(n-1) + \eta \cdot Si \cdot Sj$$

$$Wij = Wij(n-1) + \Delta Wij$$

where $\delta i$ represents a propagation error of a neuron i, and ti represents an educator signal for the neuron i. Coefficients $\alpha$ and $\eta$ are constants called a coefficient of inertia and a learning coefficient respectively. Further, $Wij(n-1)$ and $\Delta Wij(n-1)$ represent a synapse load value and an amount of load value correction in a precedent learning cycle.

The sigmoid function f(x) as employed is expressed as follows:

$$f(x) = 1.0/(1.0 + \exp(-x/T))$$

where T is called a temperature of the neural network, and the function slope is expressed in a coefficient 1/T. The temperature T plays an important role in simulated annealing.

Referring to FIG. 11, an offset value for the input value x is 3 when the width of a variable area is 2, and the sigmoid function f(x) and the differential coefficient f'(x) are translated to regions having input variables X of 2 to 4. With respect to an output value Y, the value area of the sigmoid function f(x) is 0 to 1 regardless of the slope (or the temperature), and the lookup table 81 stores data (function value) of the output value Y translated to have a value of 1 to 2. The differential coefficient f'(x) having a value area of 0 to 0.25 is translated to a range of 0.25 to 0.5 where the exponent part is constant.

As clearly understood from FIG. 11, the nonlinear functions which are stored in the lookup table 81 are in arbitrary shapes. It is possible to store arbitrary function values having finite variable and output value areas such as saturated nonlinear functions and localized nonlinear functions in the lookup table 81.

Figure 12:
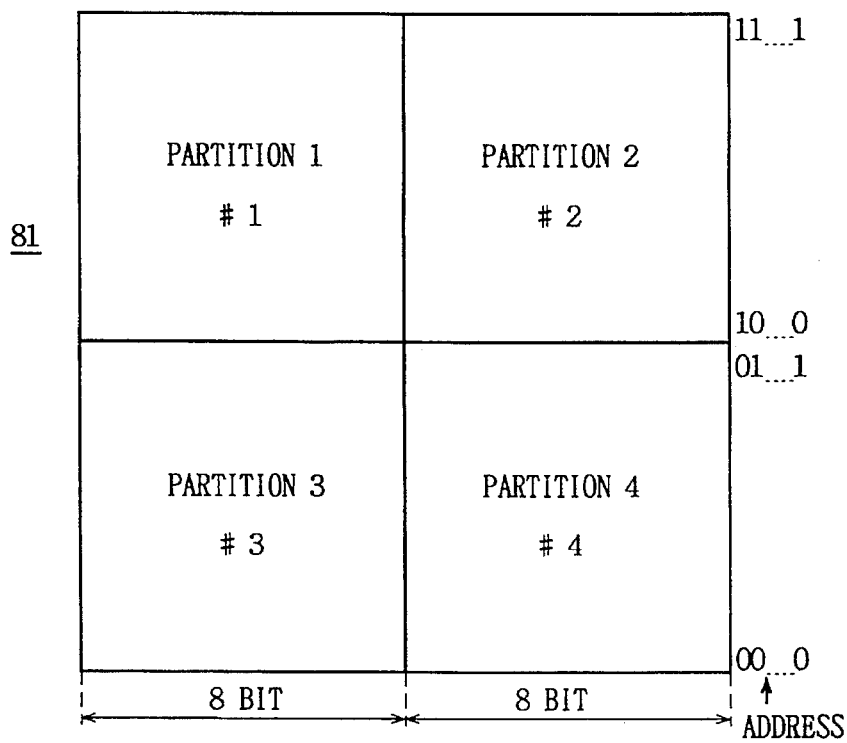
FIG. 12 schematically illustrates the structure of the lookup table shown in FIG. 10.

FIG. 12 illustrates an exemplary structure of the lookup table 81. Referring to FIG. 12, the memory region of the lookup table 81 is divided into four partitions #1 to #4. The partitions #3 and #4 are arranged in regions of addresses (00 . . . 0) to (01 . . . 1), while the partitions #1 and #2 are arranged in regions of addresses (10 . . . 0) to (11 . . . 1). The bit numbers of the addresses are decided by accuracy which is required for nonlinear conversion. The partitions #1 to #4 have the same sizes (storage capacity). When a 16-bit-4K-word memory is employed for the lookup table 81, for example, each of the partitions #1 to #4 has an 8-bit-2K-word structure. In this case, therefore, function values are stored in 8-bit accuracy.

The memory region can be divided not into the four partitions shown in FIG. 12 but into two partitions. In this case, it is possible to utilize the partitions #1 and #3 as a single partition while utilizing the partitions #2 and #4 as a single partition, for example. When a 16-bit-4K-word memory is divided into two partitions in this structure, for example, each partition has an 8-bit-4K-word structure.

It is also possible to utilize the partitions #1 and #2 as a single partition while utilizing the partitions #3 and #4 as a single partition. In this case, each partition has a 16-bit-2K-word structure when a 16-bit-4K-word memory is employed.

Figure 13:
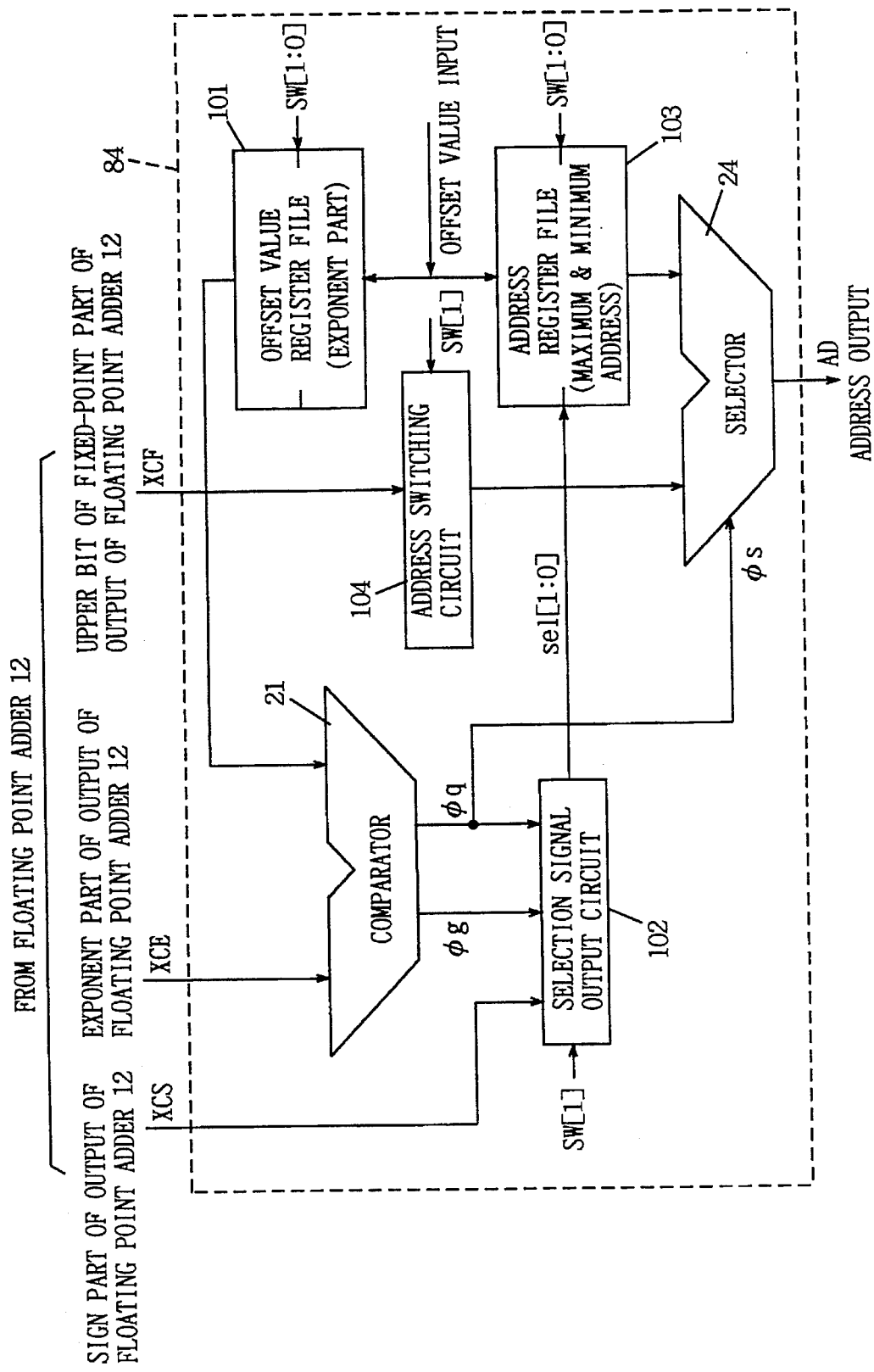
FIG. 13 schematically illustrates the structure of an address decoder shown in FIG. 10.

FIG. 13 illustrates an exemplary structure of the address decoder 84 shown in FIG. 10. The structure shown in FIG. 13 is adapted to generate addresses in relation to the lookup table 81 which is divided into four partitions as shown in FIG. 12.

Referring to FIG. 13, the address decoder 84 includes an offset value register file 101 storing values of exponent parts of input value offsets for the respective nonlinear functions which are stored in the lookup table 81, a comparator 21 which compares exponent part data XCE in numeric data outputted from the floating point adder 12 (see FIG. 10) with corresponding exponent part data read from the offset value register file 101 for outputting signals φg and φq in accordance with the comparison result, an address register file 103 for storing maximum and minimum addresses of the respective partitions of the lookup table 81, an address switching circuit 104 for correcting upper bits XCF of mantissas of the numeric data outputted from the floating point adder 12 to addresses of the respective partitions in the lookup table 81, a selection signal output circuit 102 for generating a 2-bit selection signal sel[1:0] for selecting an address stored in the address register file 103 in accordance with the output signals φg and φq received from the comparator 21 and sign part data XCS of the numeric data outputted from the floating point adder 12, and a selector 24 which receives the signal φq outputted from the comparator 21 as a selection signal φs for selecting one of the output of the address switching circuit 104 and the address read from the address register file 103. The selector 24 outputs an address AD for the lookup table 81.

The offset value register file 101 stores an externally applied offset value (exponent part data) in a prescribed region in accordance with an externally applied 2-bit region specifying signal SW[1:0]. The address register file 103 similarly stores externally applied offset value inputs (address data) indicating maximum and minimum addresses of the respective partitions in accordance with the region specifying signal SW[1:0]. While the offset values are assumed to be positive in this embodiment as described above, the same may alternatively be negative, with no difference in principle.

An address region is divided into two regions, and the upper region specifying signal SW[1] specifies an upper address region (region of the partitions #1 and #2) or a lower address region (region of the partitions #3 and #4). When the lookup table 81 stores the function values in 16-bit accuracy, i.e., two types of nonlinear function values, the offset value register file 101 stores exponent part data of two input offset values. When the partitions #1 to #4 store function values of different nonlinear functions respectively, exponent part data of four input offset values in total are stored in correspondence thereto. In the address register file 103, the address region is merely divided into two regions, and maximum and minimum addresses for the respective address regions are stored. Namely, the address register file 103 stores four addresses in total. One of the four addresses is selected by the 2-bit selection signal sel[1:0]. While the region selecting signal SW is a 2-bit signal in this embodiment due to employment of the four partitions, this signal may have more bits or only one bit.

The comparator 21 brings the signal φg into a state "1" when the exponent part data XCE received from the floating point adder 12 is greater than the offset value exponent part data outputted from the offset value register file 101, while the same brings the signal φq into a state "1" when both exponent part data are equal to each other. When the exponent part data XCE is less than that from the register file 101, both of the signals φg and φq are zeroed, or brought to "0".

The selection signal output circuit 102 generates the selection signal sel[1:0] in accordance with the upper region specifying signal SW[1], the sign part data (sign flag) XCS from the floating point adder 12 and the output signals φg and φq from the comparator 21. When the sign part data XCS indicates positive and the signal φg is "1", the selection signal output circuit 102 selects the maximum address of a region specified by the region specifying signal SW. When the signal φg is "0", on the other hand, the selection signal output circuit 102 generates the selection signal sel[1:0] to select the minimum address of a corresponding region in the register file 103 since the exponent part data XCE is smaller. When the signal φq is "1", either the maximum or minimum address may be selected, since the selector 24 ignores the output of the register file 103.

When the sign part data XCS is "1" indicating negative, the minimum address of a corresponding region in the register file 103 is selected.

Figures 14, 15:
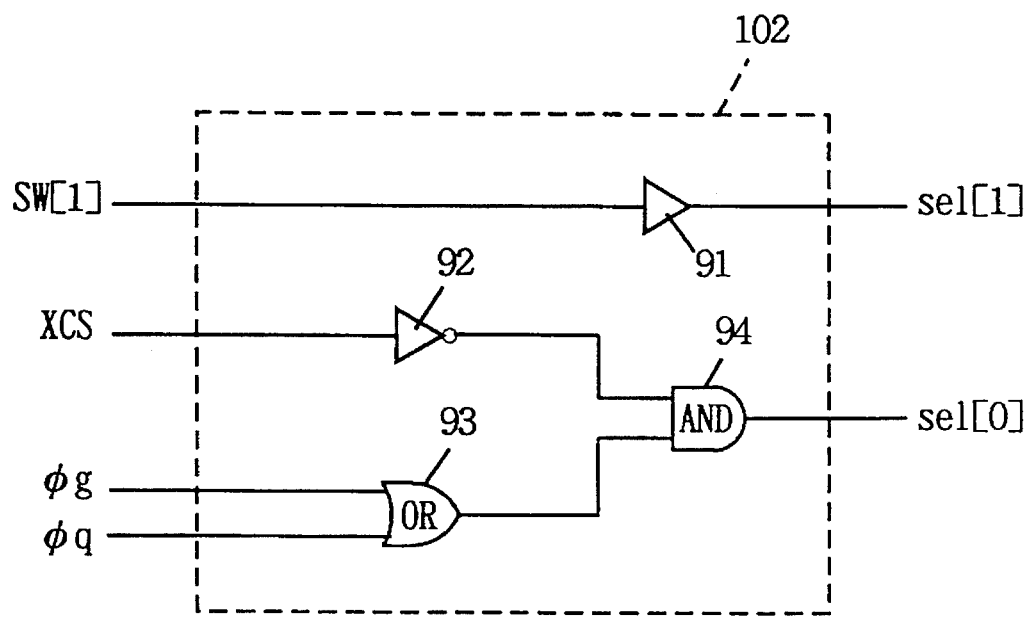
FIG. 14 illustrates correspondence between data stored in an address register file shown in FIG. 13 and selection signals.
FIG. 15 illustrates an exemplary structure of a selection signal output circuit shown in FIG. 13.

FIG. 14 illustrates correspondence between the selection signals outputted from the selection signal output circuit 102 and the addresses stored in the address register file 103. As shown in FIG. 14, the address register file 103 stores four addresses, in correspondence to the structure of the lookup table 81 shown in FIG. 12. (100 . . . 0) and (011 . . . 1) are stored as minimum and maximum addresses in correspondence to the partitions #1 and #2 of the memory region of the lookup table 81 respectively. On the other hand, (011 . . . 1) and (000 . . . 0) are stored as maximum and minimum addresses for the partitions #3 and #4 respectively. These four addresses are selected by the selection signals sel[1] and sel[0]. FIG. 14 shows such a case that the selection signal sel[1] selects the partition and the selection signal sel[0] selects the maximum and minimum addresses, as an example. The correspondence between the selection signals sel[1] and sel[0] and the respective addresses is a mere example, and another correspondence is also employable.

FIG. 15 illustrates an exemplary specific structure of the selection signal output circuit 102 shown in FIG. 13. Referring to FIG. 15, the selection signal output circuit 102 includes a buffer 91 which receives the region specifying signal SW[1], an inverter 92 which receives the sign part data XCS, an OR circuit 93 which receives the signals φg and φq, and a 2-input AND circuit 94 which receives outputs of the inverter 92 and the OR circuit 93. The buffer 91 outputs the selection signal sel[1], while the AND circuit 94 outputs the selection signal sel[0]. FIG. 16 shows a list of logics of the selection signal output circuit 102 shown in FIG. 15.

When the sign part data XCS has a constant value, the value of the selection signal sel[1] is varied with that of the region specifying signal SW[1] as shown in FIG. 16, so that the maximum or minimum address is selected in a selected region in accordance with the value of the selection signal sel[0].

The selection signal sel[1] is generated only in accordance with the region specifying signal SW since it is assumed that the offset value is normally positive in this embodiment. If the offset value is negative, however, it is necessary to form the selection signal sel[1] in consideration of this. While it may not be particularly necessary to employ a negative offset value in principle, the present invention is also applicable to a negative offset value, as a matter of course.

The structure of the selection signal output circuit 102 shown in FIG. 15 is a mere example. The selection signal output circuit 102 can be in any structure so far as it has a function of deciding whether or not an input value (converted input value) added up with an offset value is in a variable area of a corresponding nonlinear function in the lookup table and whether the converted input value is present on a right side or a left side of the variable area on a number line when the converted input value is outside the variable area, for generating the 2-bit selection signal sel [1:0] in accordance with the result of the decision. Further, the bit number of the selection signal sel outputted from the selection signal output circuit may be increased or decreased in accordance with the structure of the lookup table.

Figure 17:
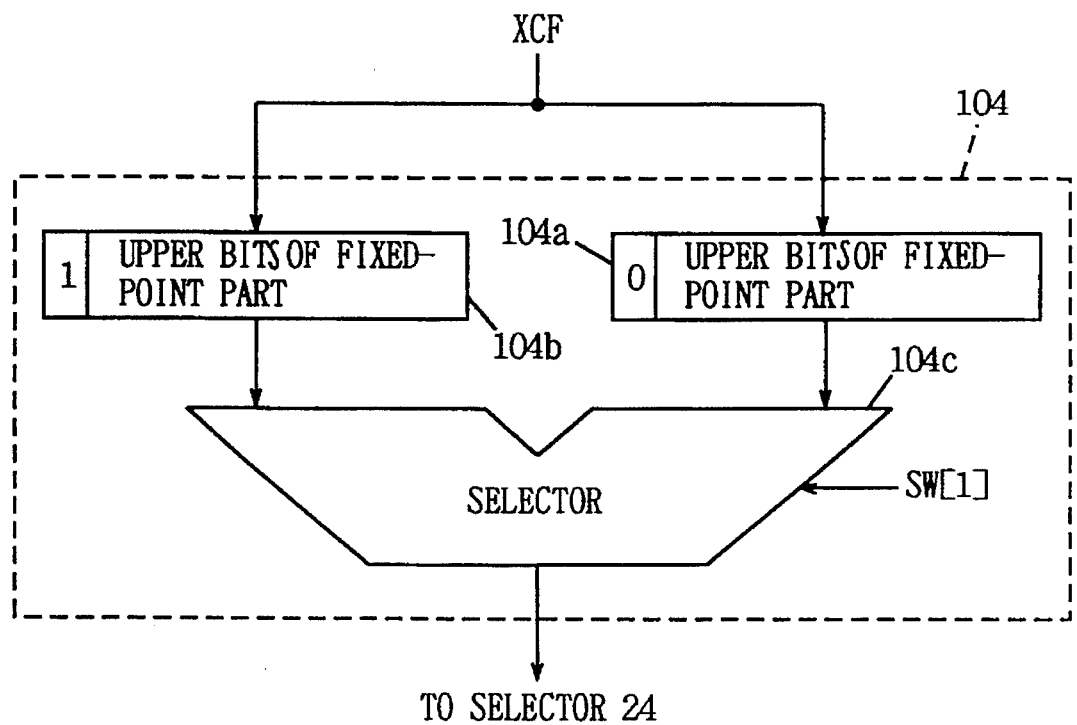
FIG. 17 illustrates the structure of an address switching circuit shown in FIG. 13.

FIG. 17 illustrates an exemplary structure of the address switching circuit 104 shown in FIG. 13. Referring to FIG. 17, the address switching circuit 104 includes address generators 104a and 104b for generating addresses for the lookup table 81 from mantissa data XCS formed by a necessary number of upper bits in mantissa data outputted from the floating point adder 12 (see FIG. 10), and a selector 104c for selecting one of outputs from the address generators 104a and 104b in response to the region specifying signal SW[1]. The address generator 104a further adds data "0" to a most significant bit position of the mantissa data XCF. The address generator 104b further adds "1" to the uppermost bit position of the mantissa data XCF.

When the memory region of the lookup table 81 is divided into 8-bit·2K-word partitions, the mantissa data XCF is formed by 10 bits and the address generators 104a and 104b output 11-bit addresses. The selector 104c selects the output of the address generator 104b when the region specifying signal SW[1] specifies an upper address region of the lookup table memory, while the same selects the output of the address generator 104a when the region specifying signal SW[1] specifies a lower address region of the lookup table 81. Also when the lookup table 81 stores function values with respect to a larger number of functions, it is possible to readily form an address for a nonlinear function to be processed with respect to the lookup table 81 by simply adding a prescribed address bit to the position of the most significant bit (a plurality of bits are also available) of the mantissa data.

Figure 18:
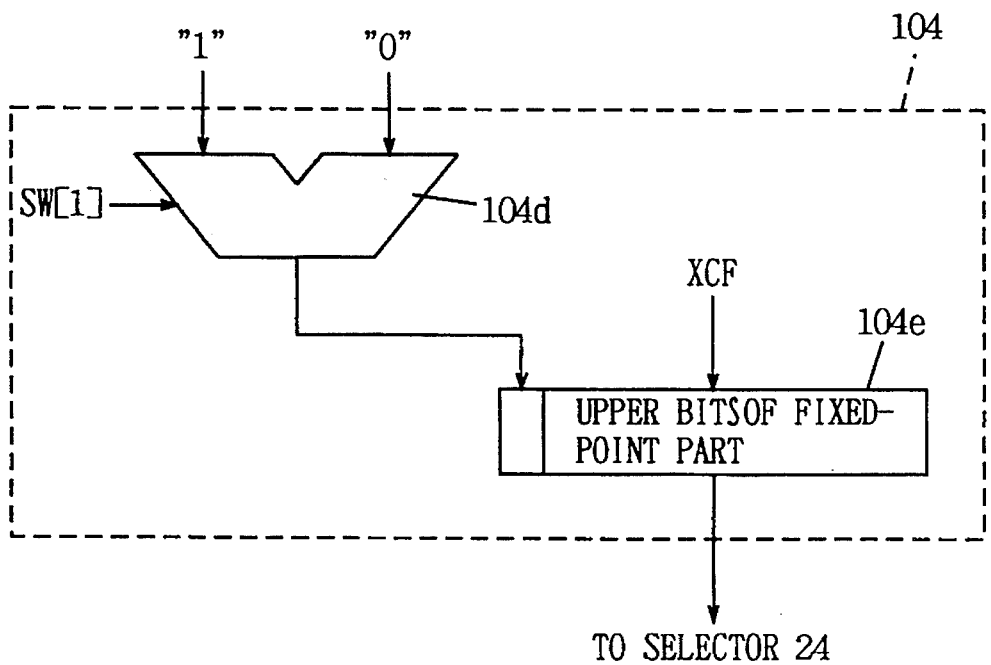
FIG. 18 illustrates another structure of the address switching circuit shown in FIG. 13.

FIG. 18 illustrates another exemplary structure of the address switching circuit 104. The address switching circuit 104 shown in FIG. 18 includes a selector 104d for selecting one of 1-bit data "1" and "0" in accordance with the region specifying signal SW[1], and an address generator 104e for generating an address having an output of the selector 104d as the most significant bit from the address bit outputted from the selector 104d and the mantissa data XCF. In the structure shown in FIG. 18, the selector 104d may select only one of two 1-bit data, whereby the device scale can be reduced. The address generator 104e may be a mere signal bus.

Figure 19:
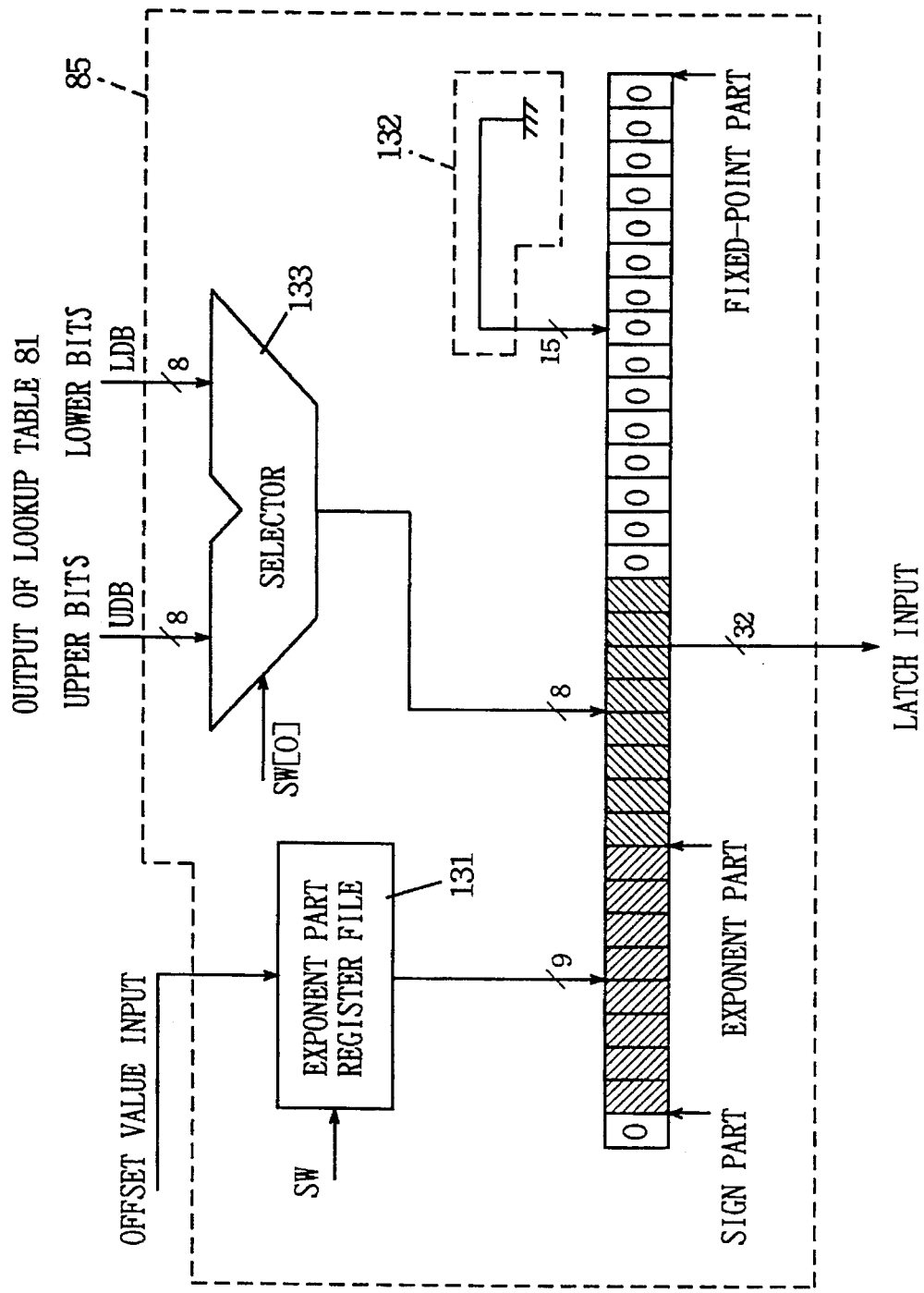
FIG. 19 illustrates the structure of a bit expansion circuit shown in FIG. 10.

FIG. 19 illustrates an exemplary structure of the bit expansion circuit 85 shown in FIG. 10. Referring to FIG. 19, the bit expansion circuit 85 includes a selector 133 which selects one of upper and lower bits UDB and LDB of a function value outputted from the lookup table 81 (see FIG. 10) in accordance with the selection signal SW[0], an exponent part register file 131 which stores data of sign parts and exponent parts of output offset values for the respective ones of the plurality of nonlinear functions stored in the lookup table 81, and a generator 132 for expanding lower bits of the mantissas.

The exponent part register file 131 outputs sign part data and exponent part data corresponding to a single function in accordance with the selection signal SW, which may be of multiple bits. When the memory region of the lookup table 81 is divided into four partitions and the respective partitions store functions of different functions as shown in FIG. 12, the exponent part register file 131 stores sign part data and exponent part data corresponding to four function values. The exponent part register file 131 outputs single sign part data and single exponent part data among these data, in accordance with the selection signal SW. Therefore, the selection signal SW supplied to the exponent part register file 131 is formed by two bits. The exponent part register file 131 outputs 1-bit sign part data and 8-bit exponent part data.

The lookup table 81 outputs function values of two nonlinear functions in parallel with each other. These function values of the nonlinear functions are expressed in the upper and lower bits UDB and LDB respectively. The selector 133 outputs one of the upper and lower bits UDB and LDB in accordance with the selection signal SW[0]. Also when the lookup table memory stores two function values in the same address region as shown in FIG. 12, it is possible to select only a necessary one of the function values.

The zero generator 132 generates 15-bit "0s", which are added to the lower bit positions of the mantissa. The bit expansion circuit 85 outputs numeric data which is expressed in floating-point representation of 32 bits including 1 bit for the sign part, 8 bits for the exponent part and 23 bits for the mantissa. The numeric data outputted from the bit expansion circuit 85 is transmitted to the latch 16c shown in FIG. 10. This bit expansion region may be formed simply by a signal line for transmitting outputs of the exponent part register file 131, the selector 133 and the zero generator 132, a register, or a 32-bit buffer circuit.

The bit expansion circuit 85 shown in FIG. 19 outputs a function value of floating-point representation which is translated to a region where the value of the exponent part is constant. The numeric data outputted from the bit expansion circuit 85 is supplied to the floating point adder 13 shown in FIG. 10. The floating point adder 13 shown in FIG. 10 subtracts the offset value received from the offset value register file 83 from the numeric data outputted from the bit expansion circuit 85, to obtain the final function value in floating-point representation. The offset value register file 83 shown in FIG. 10, which is similar in structure to the output register file 131 shown in FIG. 19, stores output offset values corresponding to respective ones of nonlinear functions, and outputs a corresponding offset value (offset value in floating-point representation) in accordance with the selection signal. The input of the offset value in the offset value register file 83 shown in FIG. 10 is executed in parallel with input of the sign part data and the exponent part data in the exponent part register file 131 shown in FIG. 19.

In the structure shown in FIG. 10, latches 16a, 16b and 16c are provided for executing processing in this nonlinear conversion circuit in a pipeline manner, similarly to the first embodiment. The processing flow is identical to that of the operation in the pipeline stages shown in FIG. 9.

As hereinabove described, function values of a plurality of nonlinear functions are stored in the lookup table 81 according to the second embodiment, whereby it is possible to execute a plurality of nonlinear conversion processing operations by a single lookup table for reducing the device scale with no requirement for provision of nonlinear conversion circuits for the respective nonlinear conversion processing operations.

[Embodiment 3]

Figure 20:
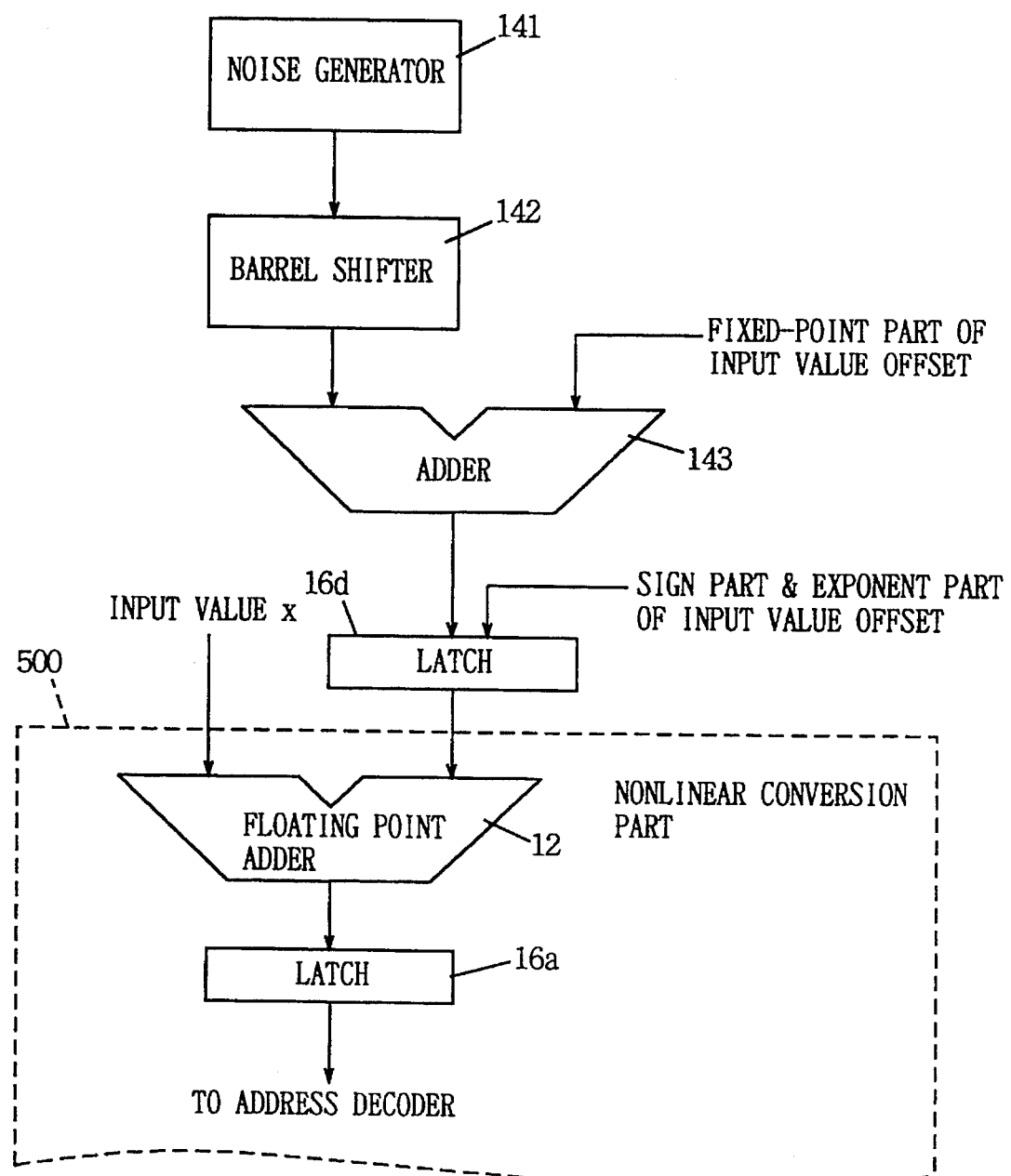
FIG. 20 schematically illustrates the structure of a nonlinear conversion circuit according to a third embodiment of the present invention.

FIG. 20 schematically illustrates the structure of a nonlinear conversion circuit according to a third embodiment of the present invention. In the nonlinear conversion circuit shown in FIG. 20, a noise generator 141 for generating noise data, a barrel shifter 142 for changing the amplitude of the noise data outputted from the noise generator 141, and an adder 143 for adding up the output of the barrel shifter 142 with mantissa data of an input value offset are newly provided for generating an offset value for an input value x. A floating point adder 12 floating point-adds the output of the adder 143 with the input value x. The output of the floating point adder 12 is supplied to an address decoder through a latch 16a, so that conversion processing similar to that of the first or second embodiment is executed. This nonlinear conversion circuit 500 is identical in structure to that shown in FIG. 5 or 10.

The noise generator 141 generates M-series pseudo-random numbers based on a shift register.

The barrel shifter 142 rightwardly shifts the output of the noise generator 141 by a predetermined digit number in accordance with an external shift specifying signal (not shown), for example. The most significant bit (sign bit) of the output from the noise generator 141 is inserted in the most significant bit position which is empty due to shifting in the barrel shifter 142. Namely, the barrel shifter 142 implements a function of rightward arithmetic shifting (arithmetic rightward shifting), and divides the noise data generated by the noise generator 141 by $2^{-m}$, where m represents the shift digit number in the barrel shifter 142.

The adder 143 adds up the output of the barrel shifter 142 and the fixed-point data of the input value offset. The adder 143 receives data of the mantissa, to execute ordinary addition of fixed-point representation. The output of the adder 143 indicates the data of the mantissa of the input value offset which is superimposed with the noise, and a latch 16d adds a sign part and an exponent part of the input value offset thereto, to generate an input value offset in floating-point representation. The latch 16d simply stores sign part data and exponent part data in its upper bit position as an operation of generating the input value offset of floating-point representation, similarly to the bit expansion operation in the first or second embodiment.

The noise generator 141 generates the noise data by the pseudo-random numbers. In a neural network such as a Boltzmann machine employing probability distribution, for example, a noise signal whose amplitude is gradually reduced is generated in learning made of operation. This noise signal enables change of output states of neurons provided in a hidden layer with no influence by output states in a precedent cycle during initial stages of learning phases (plus and minus phases). When the amplitude of the noise signal is gradually reduced, the output states of the neurons are enabled to be annealed to the minimum value (global minimum) and fixed. Also in a general associative operation, noise is employed for preventing the neural network from being captured by a local minimum when output states of neurons are stochastically decided. In this case, a noise signal performing amplitude damping oscillation is added to threshold values of the neurons. This operation is implemented by superimposing noise data on input values.

It is possible to provide a threshold conversion processing part with a noise generating function in a neural network such as a Boltzmann machine in accordance with probability distribution by employing a noise generator such as that shown in the third embodiment. The noise data is merely integer-added with mantissa data of the input value offset, and hence it is possible to readily generate input data (neuron output value) to which noise is added. Floating-point representation of the noise data is also implemented by simply adding the sign and exponent part data in the latch 16d, whereby noise-superimposed data in floating-point representation can be readily generated.

The noise is generated from the noise generator 141 in synchronization with a clock signal such as a system clock, while the latch 16d also carries out a latch operation in synchronization with the clock signal such as a system clock. Therefore, it is possible to execute the generation of the noise data and an operation of offsetting the input value by adding the noise thereto in a pipeline manner. The barrel shifter 142 shifts output data of the noise generator 141 by a predetermined digit number. Shifting may be continuously carried out a plurality times under the control of the exterior in one clock cycle. It is possible to generate noise data simulating a noise signal reliably performing damping oscillation with lapse of time.

Figure 21:
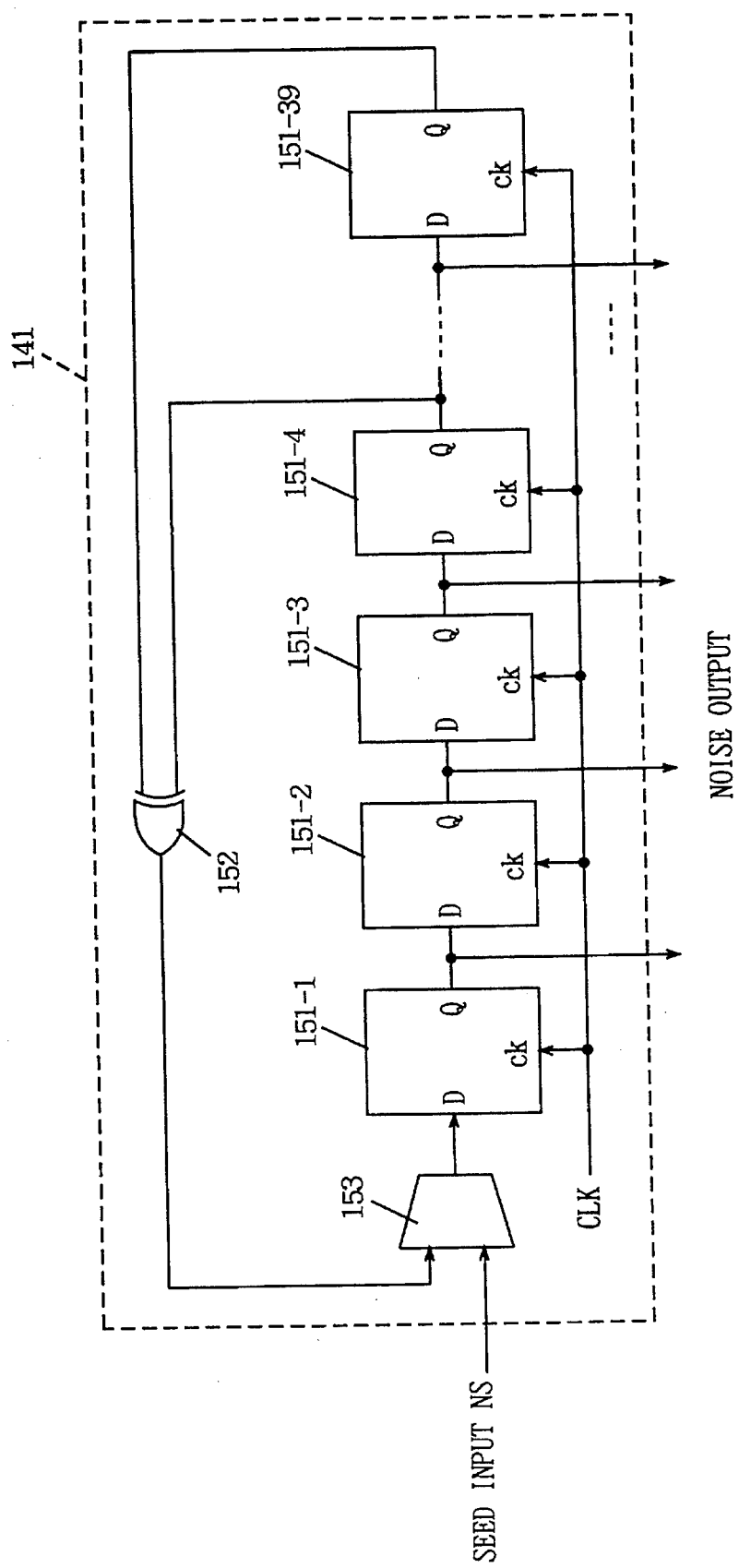
FIG. 21 illustrates an exemplary structure of a noise generator shown in FIG. 20.

FIG. 21 illustrates an exemplary structure of the noise generator 141 shown in FIG. 20. Referring to FIG. 21, the noise generator 141 includes a shift register including 39 stages of 1-bit registers 151-1 to 151-39 which are connected in series with each other, a 2-input EXOR circuit 152 which receives outputs of the final stage 1-bit register 151-39 and an arbitrary 1-bit register (the fourth stage 1-bit register 151-4 in FIG. 21), and a selector 153 for selecting one of the output of the EXOR circuit 152 and an externally supplied noise seed input NS.

The output of the selector 153 is supplied to an input (D) of the first stage 1-bit register 151-1. The seed input NS has 39 bits, which are respectively stored in the 1-bit registers 151-1 to 151-39 in an initial operation. The 1-bit registers 151-1 to 151-39 latch supplied data in synchronization with a clock signal CLK which is a system clock, for example, for transmission to the subsequent stage 1-bit registers.

The noise generator 141 shown in FIG. 21 outputs numeric data which are generally called pseudo-random number of M series. The term "M series" means "random number series having the longest cycle". After the seed input NS is stored in the respective 1-bit registers (shift register), the random number generator 141 brings the selector 153 into a state for selecting the output of the register 151-39. The EXOR circuit 152 outputs a signal of "0" when the outputs of the registers 151-4 and 151-39 have the same logical value, while outputting a signal of "1" when the outputs have different logic values. In accordance with the clock signal CLK, the output of the EXOR circuit 152 is fed back to the initial stage 1-bit register 151-1 through the selector 153, so that new numeric data having no dependency on numeric data outputted from the noise generator 141 in a precedent cycle is outputted every clock cycle. The output of the noise generator 141 is cut out by the same bit number as that of the exponent part of the input value offset in the 1-bit registers 151-1 to 151-39, and supplied to the barrel shifter 142.

Figure 22:
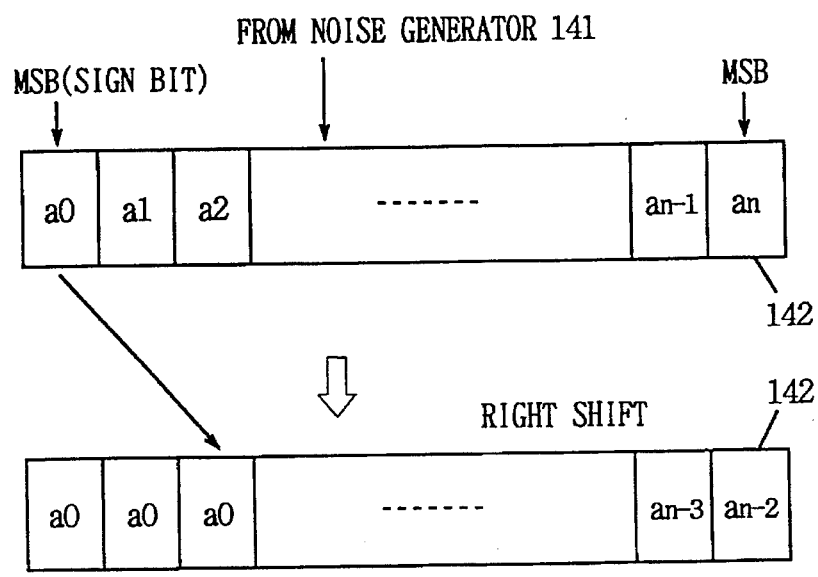
FIG. 22 is a diagram for illustrating an operation of a barrel shifter shown in FIG. 20.

FIG. 22 typically shows an operation of the barrel shifter 142. As shown in FIG. 22, the barrel shifter 142 receives noise data a0 to an from the noise generator 141, and rightwardly shifts the received data by a prescribed number of bits. Referring to FIG. 22, the barrel shifter 142 rightwardly shifts the data by two bits, for example. The most significant bit MSB (sign bit) of the noise data received from the noise generator 141 is stored in the most significant bit position of the barrel shifter 142 after shifting. The noise data is negative when the most significant bit of the output from the barrel shifter 142 is "1", while the noise data is positive when the most significant bit is "0" (in a case of two's complement representation). Thus, it is possible to generate noise data changed to positive or negative from arbitrary noise data, while changing its amplitude. In order to gradually reduce the amplitude, the shift digit number in this barrel shifter 141 may be increased.

As hereinabove described, the noise data is added to the input value offset according to the third embodiment, whereby it is possible to generate an input value to which noise is added in a simple circuit structure. In particular, the noise is added through the data of the mantissa, whereby it is possible to readily superpose noise data to numeric data expressed in floating-point representation.

[Embodiment 4]

Figure 23:
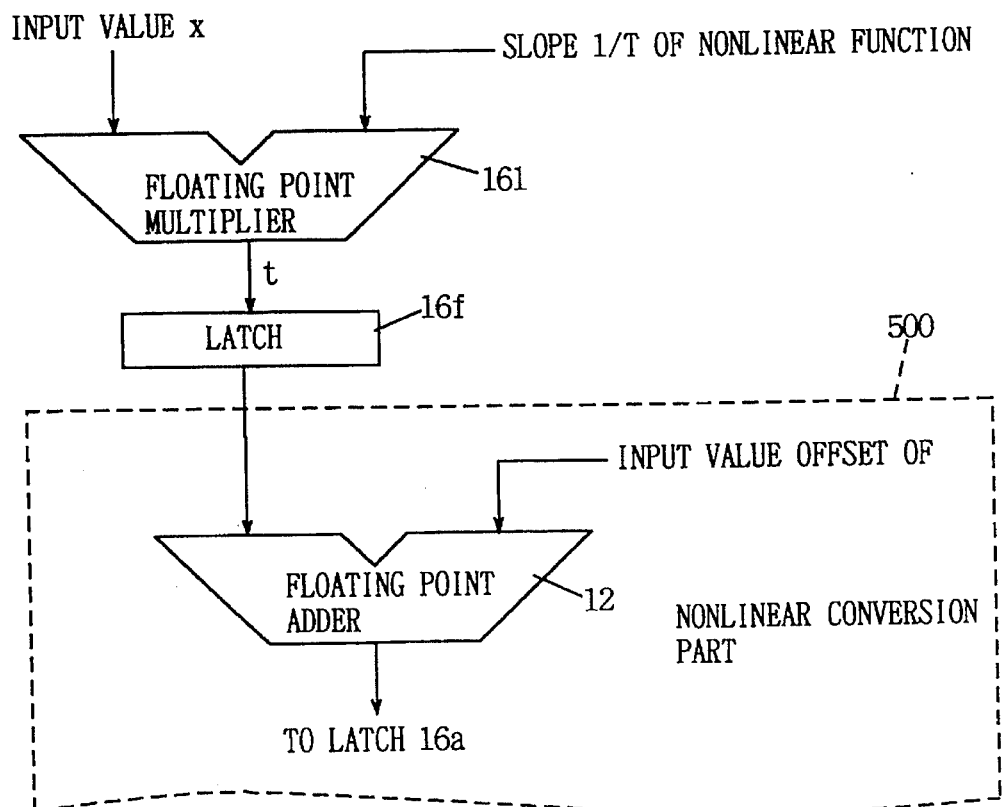
FIG. 23 schematically illustrates the structure of a nonlinear conversion circuit according to a fourth embodiment of the present invention.

FIG. 23 illustrates the structure of a nonlinear conversion circuit according to a fourth embodiment of the present invention. Referring to FIG. 23, the nonlinear conversion circuit includes a floating point multiplier 161 for multiplying an input value x by a function slope 1/T, a latch 16f for latching the output of the floating point multiplier 161 in synchronization with a clock signal such as a system clock, and a nonlinear conversion part 500 for nonlinear-converting the output of the latch 16f. The nonlinear conversion part 500 is identical in structure to that shown in FIG. 5 or 10.

The data 1/T indicating a nonlinear function slope is supplied from the exterior. This function slop data 1/T is continuously changed. Thus, an operation such as simulated annealing employed in a neural network such as a Boltzmann machine is implemented. The floating point multiplier 161 outputs t=x·(1/T). The nonlinear conversion part 500 executes nonlinear conversion with an input value of t. When a lookup table provided in the nonlinear conversion part 500 stores the following function:

$$f(x)=1.0/(1.0+\exp(-x))$$

the following two processing operations are executed:

$$t=x·(1.0/T)$$

$$f(t)=1.0/(1.0+\exp(-t))$$

Figure 24:
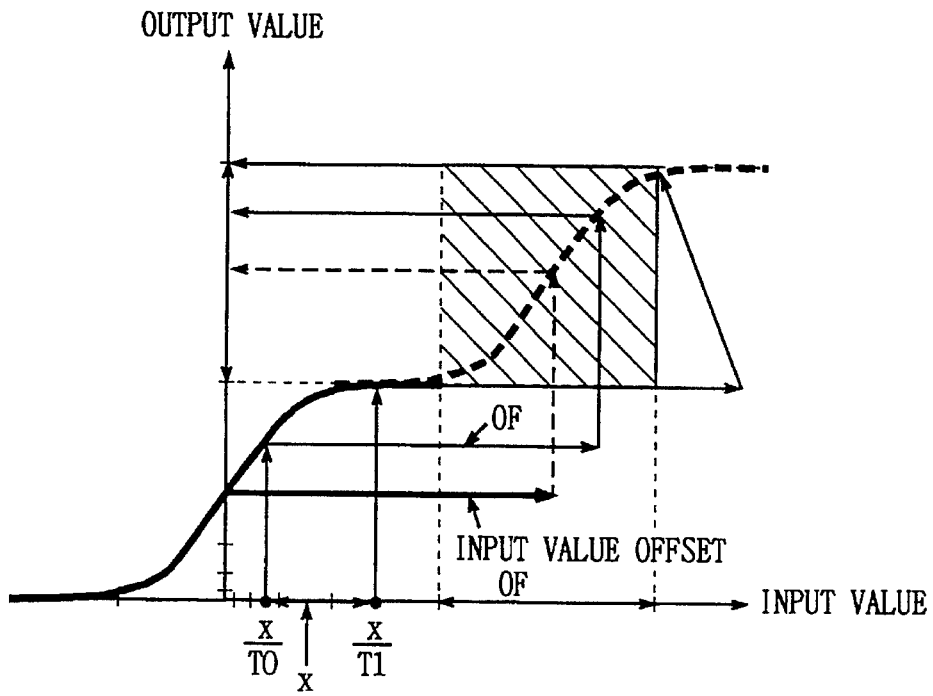
FIG. 24 is a diagram for illustrating an operation of the nonlinear conversion circuit shown in FIG. 23.

FIG. 24 shows this processing. If the input value x is multiplied by a nonlinear function slope 1/T0 when a temperature T is at a value T0 which is greater than 1, $|x/T0|<|x|$ and the variable x/T0 is converted to a variable in a region where an exponent part is constant even if an input value offset is added. When the temperature T is at a value T1 which is less than 1, on the other hand, $|x/T1|>|x|$ and the offset variable may be present in a region out of that where the exponent part is constant. Also in this case, however, this variable is converted to the maximum or minimum address by an address decoder which is provided in the nonlinear conversion part 500. Thus, it is possible to reliably carry out nonlinear conversion similarly to the processing operations described above with reference to the first and second embodiments, regardless of the value of the function slope 1/T.

Even if the nonlinear conversion part 500 stores one nonlinear function in this case, the operation is equivalent to nonlinear conversion which is carried out through nonlinear functions of various slopes, as shown in FIG. 11. Therefore, it is possible to continuously change the function slope 1/T by externally supplying the data of the nonlinear conversion function slope 1/T and multiplying the input value x by the slope in the floating point multiplier 161, thereby readily implementing a simulated annealing operation in a Boltzmann machine based on probability distribution.

In general, an operation of multiplying the input value x by a certain value k and inputting the multiplication result k·x in the nonlinear conversion part 500 is equivalent to an operation for scaling up or scaling down the nonlinear function (in relation to the input value). Namely, this corresponds to calculation of F(k·x) with respect to a function F(x), where k represents a parameter expressing scaling-up or scaling-down. Assuming that the function F(x) is a nonlinear function stored in the lookup table, therefore, the operation corresponds to calculation of a function by scaling up or down this function. If the coefficient k is a negative number, further, it is also possible to carry out a mirror operation.

Consider that a value OF−α which is smaller than an input value offset OF for translating a nonlinear function to a region having a constant exponent part by a value α is added to the input value x.

Figure 25:
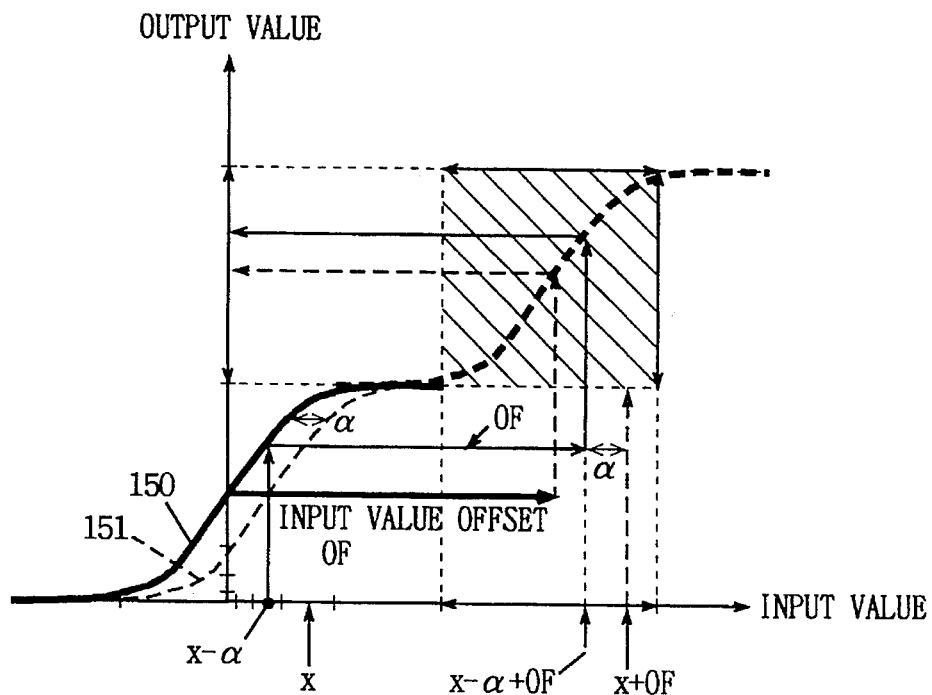
FIG. 25 is a diagram for illustrating an operation of a modification of the nonlinear conversion circuit shown in FIG. 23.

In this case, an offset input value X is expressed as follows, as shown in FIG. 25:

$$X=x+OF-\alpha=(x-\alpha)+OF$$

Therefore, it is possible to obtain a function value f(x−α) by nonlinear-converting the offset input value X. As shown in FIG. 25, this corresponds to nonlinear conversion processing employing a nonlinear function 151, shown by a broken line, obtained by shifting a nonlinear function 150 in a positive direction with respect to the input value by α. Namely, the operation of adding the value which is obtained by subtracting a certain constant α from the input value offset OF to the input value x corresponds to an operation of shifting the origin of the input value, i.e., an operation of translating the function f(x) to a function f(x−α).

Figure 26:
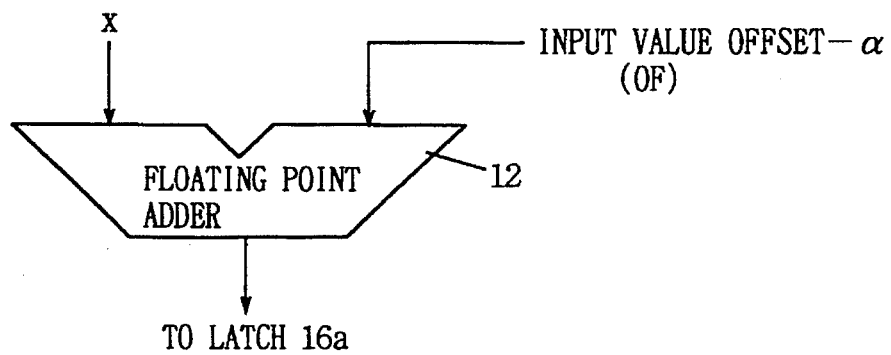
FIG. 26 schematically illustrates a structure for implementing the processing operation shown in FIG. 25.

As shown in FIG. 26, the operation for shifting the origin is implemented by floating point-adding the input value x and the offset value OF−α in a first stage floating point adder 12 provided in the conversion part 500. The offset value OF−α may be stored previously with reduction by the value α, when the input value offset data is stored in a register.

Figure 27:
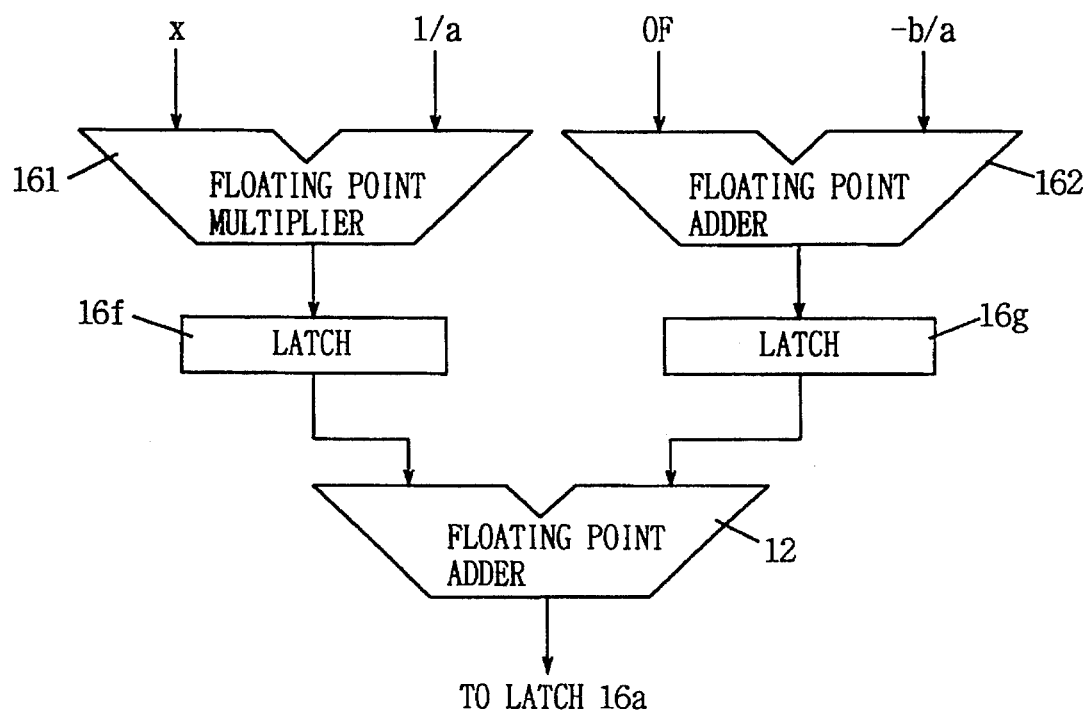
FIG. 27 illustrates a structure obtained by combining the structures shown in FIGS. 23 and 25 with each other.

FIG. 27 illustrates a structure obtained by combining those shown in FIGS. 23 and 26. Referring to FIG. 27, the floating point multiplier 161 floating point-multiplies the input value x by a prescribed coefficient 1/a. A floating point adder 162 floating point-adds up the input value offset OF and a prescribed coefficient −b/a. Latches 16f and 16g are employed to synchronize output operations of the floating point multiplier 161 and the floating point adder 162 with each other and to bring the conversion operation into a pipeline state. The floating point adder 12 floating point-adds up the outputs generated by the floating point multiplier 161 and the floating point adder 162. The output of the floating point adder 12 is transmitted to the latch 16a, so that nonlinear conversion processing is carried out similarly to the first or second embodiment. Assuming that a lookup table stores a nonlinear conversion function f(x) in the structure shown in FIG. 27, the following output value y is obtained with respect to the input value x:

$y=f(x/a-b/a)=f((x-b)/a)$

This corresponds to an operation of scaling up (expansion) or scaling down (compression) the nonlinear function f(x) and negatively moving the origin by b, or an operation of positively shifting the function f(x) by b. The structure shown in FIG. 27 can be employed for calculating wavelet conversion with respect to the input value x. In wavelet conversion, wavelets of various scales are employed for carrying out similar conversion and shifting on a basic wavelet (mother wavelet function or analyzing wavelet function). Wavelet conversion S(a,b) of a signal s(t) is defined as follows, in the case of discrete wavelet conversion:

$$g_{a,b}(t) = \frac{1}{\sqrt{a}} g\left(\frac{t-b}{a}\right) : \text{BASIC WAVELENGTH}$$

$$S(a, b) = <g_{a,b}(t)|s(t)> : \text{INNER PRODUCT}$$

$$s(t) = \frac{2}{A+B} \sum_a \sum_b S(a, b) \cdot g_{a,b}(t)$$

A, B : CONSTANT (frame bound)

The basic wavelet is a typical localized nonlinear function provided with an average value of zero having such a shape that its amplitude is abruptly reduced as being remoted from its origin. An exemplary wavelet function is that called a Gauss wavelet, which is expressed as follows:

$$g(n) = \exp\left(-\frac{n^2}{2}\right) \cdot (\exp(2\pi jn) - \exp(-2\pi^2))$$

When time frequency analysis is made through wavelet conversion, the following processing operation is basically carried out: A basic wavelet is enlarged to a times on a time base, to examine loose fluctuation of a signal as a base function. Then, the basic wavelet is reduced (compressed) to 1/a, to detect abrupt fluctuation or sudden change of the signal. Then, the wavelet is shifted by b, to detect the time of occurrence of the change. Such wavelet conversion is employed in various fields such as those for analysis of a turbulent flow, signal analysis, and coding and pattern recognition of pictures.

Referring to FIG. 27, the floating point adder 162 is employed for floating point-adding the input value offset OF and the value −b/a. If the value −b/a is fixed and unchanged, a value obtained by adding up the input value offset OF and this value −b/a may be previously stored in a register circuit so that the result OF−b/a is directly supplied to the floating point adder 12 which is included in the nonlinear conversion processing part.

According to the structure of the fourth embodiment, as hereinabove described, it is possible to execute operations for expanding and compressing the nonlinear conversion function, due to employment of the multiplier for multiplying an input value by a certain coefficient. When data indicating a function slope is supplied to the multiplier as coefficient data, it is possible to apply the structure of this embodiment to a neural network such as a Boltzmann machine in accordance with probability distribution, by externally changing the function slope.

Further, it is possible to implement an operation of moving the origin of a nonlinear function by shifting the value of an input value offset with respect to an input value. When a wavelet function is stored in the lookup table by combination of the multiplying function and the input value offset shifting operation, in addition, it is possible to apply the nonlinear conversion circuit to wavelet conversion.

[Embodiment 5]

Figure 28:
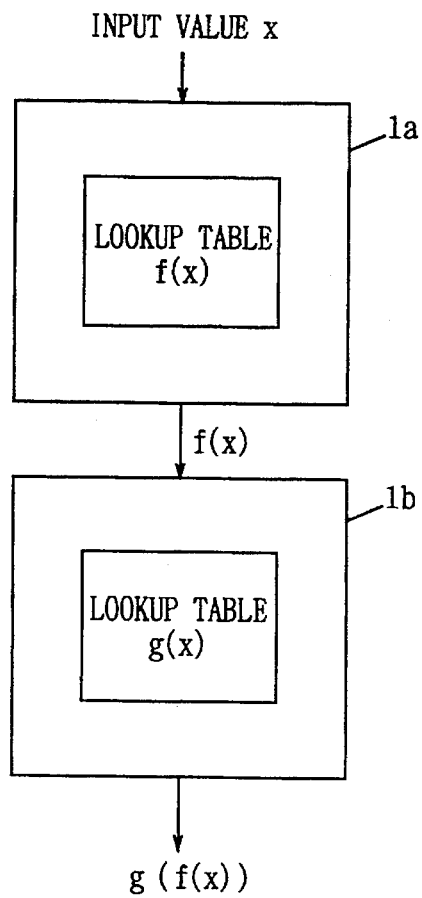
FIG. 28 schematically illustrates the structure of a nonlinear conversion circuit according to a fifth embodiment of the present invention.

FIG. 28 illustrates the structure of a nonlinear conversion circuit according to a fifth embodiment of the present invention. Referring to FIG. 28, two nonlinear conversion circuits 1a and 1b are cascade-connected with each other. Lookup tables of these nonlinear conversion circuits 1a and 1b store function values of nonlinear functions f(x) and g(x) respectively. The nonlinear conversion circuits 1a and 1b are similar in structure to those described above with reference to the first to fourth embodiments. Each of the nonlinear conversion circuits 1a and 1b may store function values of a plurality of nonlinear functions.

In the structure shown in FIG. 28, the nonlinear conversion circuits 1a and 1b output function values f(x) and g(f(x)) with respect to an input value x respectively. Thus, it is possible to continuously execute two nonlinear conversion operations at a high speed.

In the fifth embodiment, three or more nonlinear conversion circuits may be cascade-connected with each other.

According to the fifth embodiment, as hereinabove described, it is possible to continuously execute a plurality of nonlinear conversion operations at a high speed.

[Embodiment 6]

Figure 29:
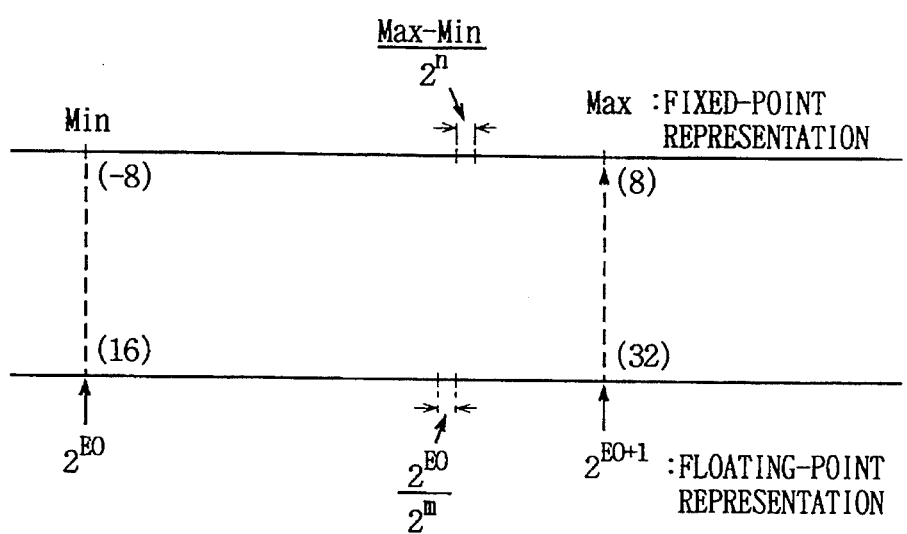
FIG. 29 is a diagram for illustrating a format conversing operation according to a sixth embodiment of the present invention.

(a) Format Conversion from Floating-Point Representation to Fixed-Point Representation:

As shown in FIG. 29, it is possible to make regions [Min, Max] of maximum and minimum values Max and Min in fixed-point representation correspond to regions $[2^{E0}, 2^{E0+1}]$ where values of exponent parts in floating-point representation are constant. In fixed-point representation, resolution is expressed in $(Max-Min)/2^N$. Also in floating-point representation, resolution is expressed as $2^{E0}/2^M$ in the regions where the values of the exponent parts are constant. When $(Max-Min)=2^{E0}$ and M=N, it is possible to bring numeric values of floating-point representation into one-to-one correspondence to those of fixed-point representation. A technique of converting numeric values of floating-point representation to those of fixed-point representation is now described.

Figure 30:
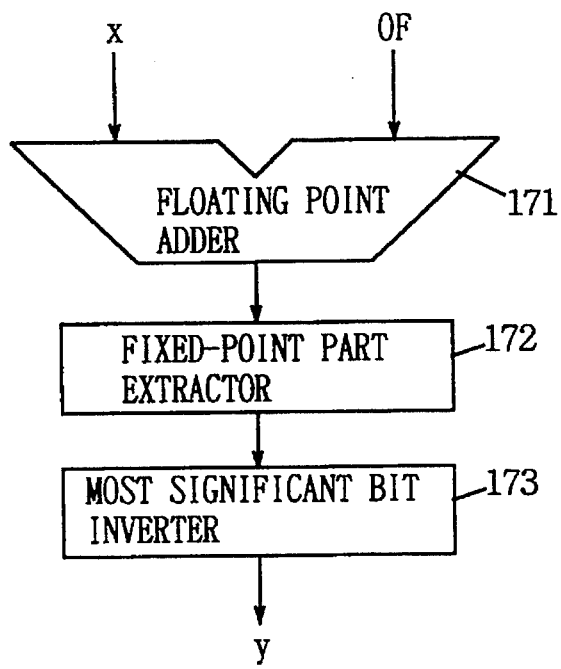
FIG. 30 illustrates the structure of an apparatus for converting numeric data of floating-point representation to fixed-point representation data.

FIG. 30 illustrates the structure of a format converter for converting floating-point representation to fixed-point representation. Referring to FIG. 30, the format converter includes a floating point adder 171 for floating point-adding up an input value x of floating-point representation and a prescribed input value offset OF, a mantissa extractor 171 for extracting mantissa data from an output of the floating point adder 171, and a most significant bit inverter 173 for inverting only the most significant bit of output data extracted by the mantissa extractor 172.

Figure 31:
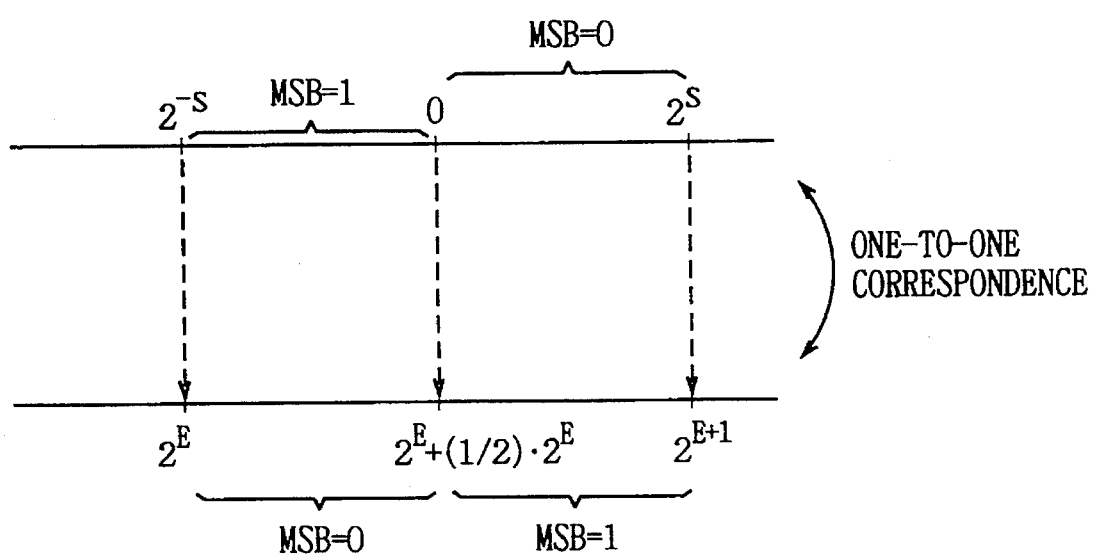
FIG. 31 is a diagram for illustrating an operation of the format converter shown in FIG. 30.

The floating point adder 171 has a function of moving a prescribed region including the input value x to a region where the value of an exponent part is constant. This operation is similar to the operation for translating or shifting the function variable area in the aforementioned nonlinear converter. The mantissa extractor 172 extracts a necessary number of upper bits from mantissa data received from the floating point adder 171. This operation of the mantissa extractor 172 is reverse to that of the bit expansion circuit shown in FIG. 8, for example. The most significant bit inverter 173 is formed by an inverter buffer which is provided for the most significant bit of the output from the mantissa extractor 172, and a non-inverter buffer which is provided for the remaining bits. An output y of the most significant bit inverter 173 is numeric data expressing the input value x in fixed-point representation. The operation of the format converter shown in FIG. 30 is now described with reference to FIG. 31.

Due to the operation of the floating point adder 171, a certain region (region of maximum and minimum values $2^s$ and $-2^s$) of fixed-point representation is converted to a region where the value E of an exponent part is constant in floating-point representation. Namely, an origin 0 in fixed-point representation is translated to $2^E+(\frac{1}{2})\cdot 2^E$ in floating-point representation. Except a sign part, numeric data of floating-point representation is expressed as follows:

$$2^E+F\cdot 2^E$$

$$F=\Sigma a_i\cdot(\frac{1}{2})^i$$

On the other hand, numeric data y of fixed-point representation is expressed as follows, except a sign part:

$$\Sigma bp\cdot 2^p+\Sigma Cq\cdot(\frac{1}{2})^q$$

Considering translation of the origin, the following equation is obtained with respect to the numeric data of fixed-point representation:

$$2^E+(\frac{1}{2})\cdot 2^E+\Sigma bp\cdot 2^p+\Sigma Cq\cdot(\frac{1}{2})^q = 2^E+((\frac{1}{2})+\Sigma bp\cdot 2^{p-E}+\Sigma Cq\cdot 2^{q-E})\cdot 2^E$$

When the respective regions are equal in width to each other, $E=s+1$ from $2\cdot 2^S=2^{E+1}-2^E$, and hence the content of the parenthesis in the above equation can be expressed as follows:

$$(\frac{1}{2})+\Sigma bp\cdot 2^{p-s-1}+\Sigma Cq\cdot 2^{q-s-1}$$

It is clearly understood from the above expression that mantissa data of floating-point representation indicates a numeric value of fixed-point representation assuming that the mantissa of floating-point representation has the same bit number as that of numeric data of fixed-point representation including sign bits. However, the value of a sign bit b, is inverted in the most significant bit, due to addition of the coefficient ($\frac{1}{2}$).

The description employing the above expressions can also be intuitively explained as follows:

Numeric data in the region $[-2^s, 2^s]$ can be brought into one-to-one correspondence to those in the region $[2^E, 2^{E+1}]$ if the regions are identical in accuracy to each other. In the case of floating-point representation, minimum and maximum values of the mantissa are (000 ... 0) and (111 ... 1) respectively. In the mantissa of numeric data in floating-point representation, therefore, the most significant bit MSB is 0 in a region $[2^E, 2^E+(\frac{1}{2})\cdot 2^E]$, and 1 in remaining regions. This is identical to inversion of the most significant bit of numeric data in two's complement representation having an origin of $2^E+(\frac{1}{2})\cdot 2^E$. Therefore, the value of the mantissa in the region $[2^E, 2^{E+1}]$ of floating-point representation is equal to that of fixed-point representation in a corresponding fixed-point representation region $[-2^S, 2^S]$. In fixed-point representation, minimum and maximum values are (100 . . . 0) and (011 . . . 1) respectively, in two's complement representation.

Therefore, it is possible to convert numeric data of floating-point representation to that of fixed-point representation through the structure shown in FIG. 30. In this case, the position of a decimal point in the numeric data of fixed-point representation is automatically decided by the value of movement of the origin. In other words, the decimal point is located on an E-th bit position from the most significant bit of the mantissa. A specific example is now described.

A region $[-8, 8]$ of fixed-point representation can be made to correspond to a region $[16, 32]$ of floating-point representation. An input value offset is 24. Consider 3 as an input value x.

$$3=(-1)^0\cdot(1+(\frac{1}{2}))\cdot 2^1$$

When the input value offset 24 is added to the numeric value 3, obtained is:

$$27=(-1)^0\cdot(1+(\frac{1}{2})+(\frac{1}{2})^{-3}+(\frac{1}{2})^{-4})\cdot 2^4$$

Hence, the mantissa is as follows:

$$101100\ldots 0$$

When the most significant bit is inverted, obtained is:

$$0011.00\ldots 0$$

Thus, fixed-point representation of 3 is obtained. From $16=2^4$, the decimal point is located between fourth and fifth bits from the most significant bit.

As hereinabove described, it is possible to readily convert numeric data in floating-point representation to that in fixed-point representation by carrying out a translation operation of making a region of fixed-point representation correspond to a region where the value of an exponent part is constant in floating-point representation.

Figure 32:
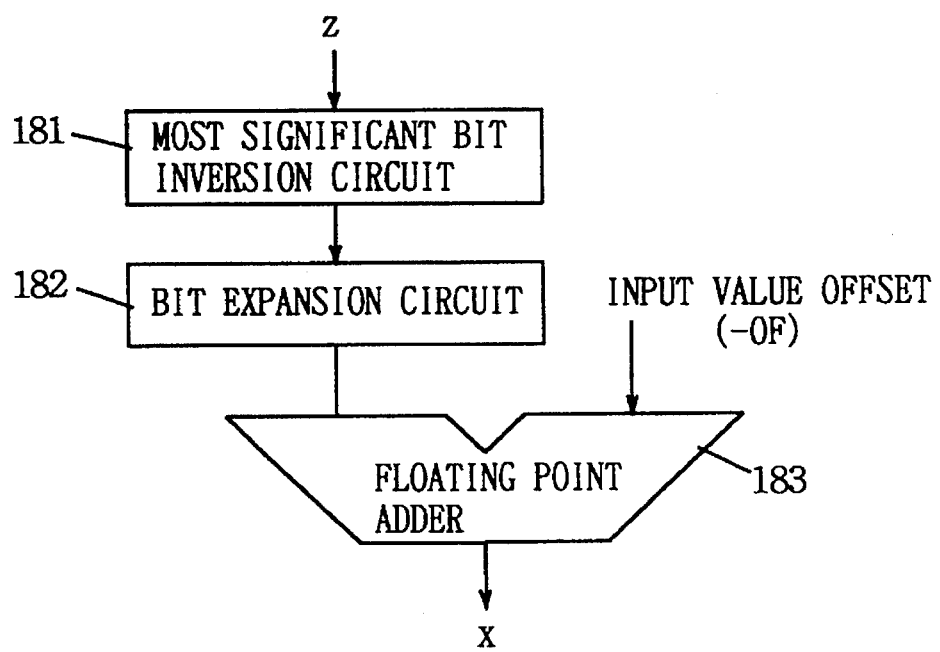
FIG. 32 schematically illustrates the structure of an apparatus for converting numeric data of fixed-point representation to those of floating-point representation.

(b) Conversion from Fixed-Point Representation to Floating-Point Representation:

FIG. 32 illustrates the structure of a format converter for converting numeric data of fixed-point representation to that of floating-point representation. Referring to FIG. 32, the format converter includes a most significant bit inversion circuit 181 for inverting the bit value of the most significant bit of numeric data z of fixed-point representation, a bit expansion circuit 182 for bit-expanding an output of the most significant bit inversion circuit 181 thereby forming numeric data of floating-point representation, and a floating point adder 183 for carrying out addition of the numeric data of floating-point representation outputted from the bit expansion circuit 182 and an input value offset (−OF) of floating-point representation. The bit expansion circuit 182, which is similar in structure to that shown in FIG. 19, adds sign part data, exponent part data and necessary mantissa lower bit data for forming numeric data of floating-point representation. The value of the lower bit added to the mantissa is "0". The floating point adder 183 subtracts a prescribed input value offset OF from numeric data outputted from the bit expansion circuit 182. The operation of the format converter shown in FIG. 32 is now described with reference to FIG. 33.

Figure 33:
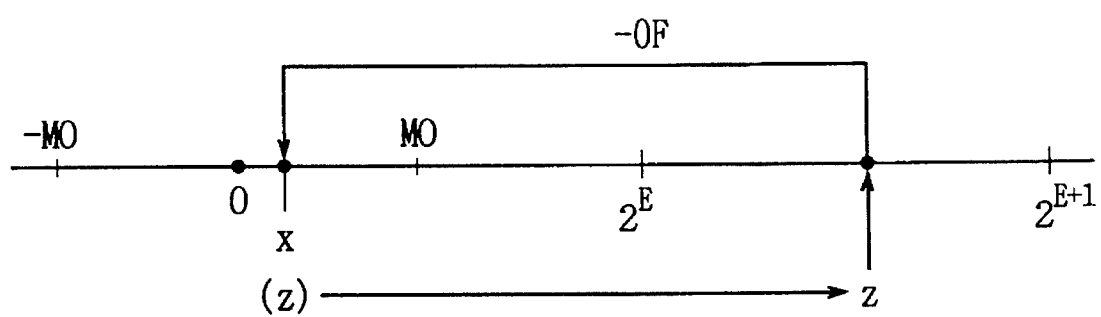
FIG. 33 is a diagram for illustrating an operation of a format converter shown in FIG. 32.
Figure 34:
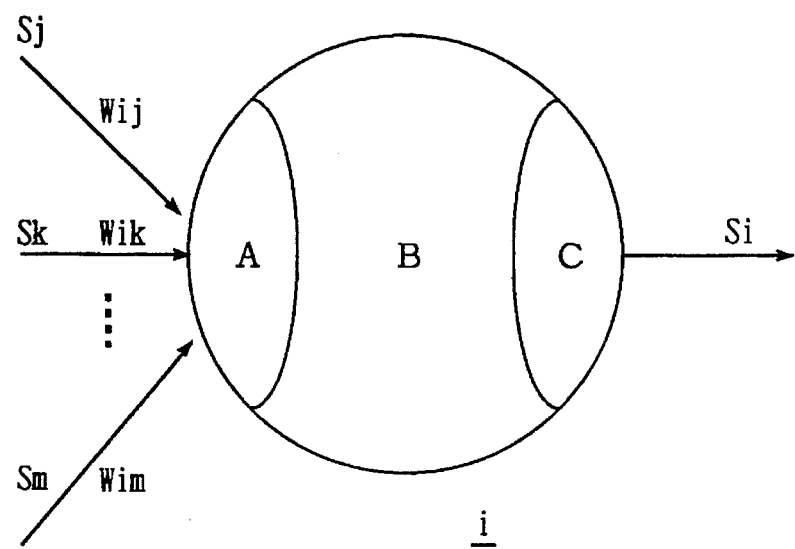
FIG. 34 is a diagram for illustrating the model of a neuron employed in a neural network.

As shown in FIG. 33, a region I-M0, M0] corresponds to a region $[2^E, 2^{E+1}]$ where the value of an exponent part is constant. The most significant bit inversion circuit 181 inverts the bit value of the most significant bit of received numeric data z of fixed-point representation. Thus, upper bit data of a mantissa of floating-point representation is formed. The bit expansion circuit 182 adds sign part data, exponent part data and mantissa lower data to an output of the most significant bit inversion circuit 181, in accordance with the offset value OF between the regions [−M0, M0] and $[2^E, 2^{E+1}]$. This operation is identical to that of the bit expansion circuit shown in FIG. 19. Thus, numeric data of floating-point representation included in the region $[2^E, 2^{E+1}]$ is formed. The numeric data of floating-point representation formed by the bit expansion circuit 182 is numeric data obtained by offsetting (translating) numeric data of floating-point representation corresponding to the numeric data z of fixed-point representation, as described with reference to the format converter shown in FIG. 31. When the input value offset OF is subtracted from the numeric data outputted from the bit expansion circuit 182, therefore, corresponding floating point numeric data x is obtained. The format conversion operation of the apparatus shown in FIG. 32 is reverse to that of the apparatus shown in FIG. 30. An example of converting 3 of fixed-point representation to 3 of floating-point representation is now described.

3 in fixed-point representation is expressed as follows:

0011.000 . . . 0

When the bit value of the most significant bit is inverted, obtained is:

1011.000 . . . 0

When sign part data and exponent part data are added thereto, obtained is:

$(-1)^0 \cdot (1+(\frac{1}{2})+(\frac{1}{2})^{-3}+(\frac{1}{2})^{-4}) \cdot 2^4$ When an offset value 24 is subtracted, obtained is:

$(-1)^0 \cdot ((\frac{1}{2})^{-3}+(\frac{1}{2})^{-4}) \cdot 2^4 = (-1)^0 \cdot (1+(\frac{1}{2})) \cdot 2^1$ This is 3 in floating-point representation.

According to the sixth embodiment of the present invention, as hereinabove described, it is possible to readily convert the form of numeric data, thereby efficiently executing arithmetic processing by generating numeric data which is appropriate for the purpose of the processing. Also in a multi-processor system having a plurality of processors carrying out processing operations employing numeric data of different forms, it is possible to carry out data communication by converting the data forms.

According to the present invention, as hereinabove described, it is possible to implement an efficient nonlinear conversion (function and filter) function having high flexibility at an extremely high speed in a digital electronic circuit for processing numeric data in floating-point representation, thereby implementing an apparatus having extremely great contribution to the field of information processing and signal processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A nonlinear function generator comprising:
   a memory for storing a value of a nonlinear function for each variable in a variable area having a first constant accuracy with each variable as an address, the first constant accuracy indicating that a distance between any adjacent variables is constant, nonlinear function values in said variable area providing an output value area having a second constant accuracy, the second constant accuracy indicating that a distance between any adjacent nonlinear function values is constant;
   input conversion means for converting an input variable so as to be included in said variable area for generating an address for said memory; and
   output conversion means for converting a function value read from said memory to an output value in a value area and a format corresponding to those of said input variable.

2. The nonlinear function generator in accordance with claim 1, wherein
   said input conversion means includes means for adding a predetermined offset value to said input variable.

3. The nonlinear function generator in accordance with claim 1, wherein
   said output conversion means includes means for adding a predetermined offset value to the function value read from said memory.

4. The nonlinear function generator in accordance with claim 1, wherein
   respective variables of said variable area have exponent parts of a common value in floating-point representation.

5. The nonlinear function generator in accordance with claim 1, wherein
   respective function values of the function value area have exponent parts of a common value in floating-point representation.

6. The nonlinear function generator in accordance with claim 1, wherein
   said input conversion means comprises:
   noise generation means for generating noise data having a changeable amplitude,
   first adder means for adding up said noise data being outputted from said noise generation means with a predetermined offset value,
   second adder means for adding up an output of said first adder means with said input variable, and
   means for generating said address for said memory in accordance with an output of said second adder means.

7. The nonlinear function generator in accordance with claim 6, wherein
   said predetermined offset value indicates a difference between a predetermined variable value area of said input variable and a corresponding value in said variable area.

8. The nonlinear function generator in accordance with claim 6, wherein
   said noise generation means includes a pseudo-random number generator.

9. The nonlinear function generator in accordance with claim 8, wherein
   said noise generation means further includes a barrel shifter for shifting an output of said pseudo-random number generator by a prescribed bit digit thereby implementing an arithmetic rightward shifting operation.

10. The nonlinear function generator in accordance with claim 1, wherein
    said memory stores only a value of a mantissa of floating-point representation of a function value of the nonlinear function corresponding to an address value generated by said input conversion means.

11. The nonlinear function generator in accordance with claim 1, wherein
    said input conversion means comprises:
    multiplier means for multiplying said input variable by a predetermined coefficient,
    adder means for adding up an output of said multiplier means with a prescribed offset value, and
    address generator means for generating said address for said memory in accordance with an output of said adder means.

12. The nonlinear function generator in accordance with claim 1, wherein said input conversion means includes means for adding up said input variable with a sum of a predetermined offset value and a preselected shift value, said predetermined offset value indicating a difference between a variable region of said input variable and the variable area, a value of an exponent part of floating-point representation of any variable in said variable area being constant.

13. The nonlinear function generator in accordance with claim 1, wherein said memory stores function values of respective ones of a plurality of nonlinear functions.

14. The nonlinear function generator in accordance with claim 13, wherein said plurality of nonlinear functions are stored in different memory regions of said memory respectively.

15. The nonlinear function generator in accordance with claim 13, wherein said plurality of nonlinear functions are stored in at least two identical address regions, each of the address regions storing two nonlinear functions having function values being outputted to different output data buses.

16. The nonlinear function generator in accordance with claim 1, wherein said memory includes a multi-bit data output bus and stores function values for respective ones of a plurality of nonlinear functions, output values of said plurality of nonlinear functions being outputted on buses of different bits of said multi-bit data output bus.

17. The nonlinear function generator in accordance with claim 1, wherein said input conversion means comprises:

adder means for floating point-adding a predetermined offset value to said input variable, comparison means for comparing the value of an exponent part of said predetermined offset value with that of an exponent part of an output of said adder means to output a signal indicating a result of the comparing, register means for storing preselected and applied maximum and minimum addresses, selection signal output means for outputting an address selection signal for said register means in accordance with the output signal of said comparison means, and selector means for selecting one of exponent part data of an output of said adder means and address data read from said register means for generating said address for said memory.

18. The nonlinear function generator in accordance with claim 17, wherein said selector means outputs only mantissa data in floating-point representation as said address for said memory.

19. The nonlinear function generator in accordance with claim 1, wherein said memory stores only a value of a mantissa part of a function value in floating-point representation of each nonlinear function value, and wherein said output conversion means comprises:

bit expansion means for linking predetermined data of an exponent part and sign part data to data being read from said memory and adjusting the bit number of a mantissa for generating numeric data of floating-point representation, and subtraction means for carrying out subtraction of an output from said bit expansion means and a predetermined offset value for generating a minimum output value in floating-point representation.

20. The nonlinear function generator in accordance with claim 19, wherein said bit expansion means includes zero generation means for adding "0" to a lower bit position of said mantissa data.

21. The nonlinear function generator in accordance with claim 1, wherein said memory stores function values of a plurality of nonlinear functions, and wherein said input conversion means includes:

offset value storage means for storing predetermined offset values in correspondence to respective ones of said plurality of functions, adder means for carrying out floating point addition of an offset value being read from said offset value storage means and said input variable, and address decoder means for extracting mantissa data of a prescribed bit from an output of said adder means.

22. The nonlinear function generator in accordance with claim 21, wherein said address decoder means includes:

decision means for deciding whether an output of said adder means is in a prescribed region of the address region of said memory, address storage means for storing maximum and minimum addresses in said memory, address selection means for selecting either one of said maximum and minimum addresses in accordance with an output of said decision means, and selection means for adding up an output of said adder means and said one of said addresses being selected by said address selection means in accordance with an output of said decision means.

23. The nonlinear function generator in accordance with claim 1, wherein said memory stores function values of respective ones of a plurality of functions in different address regions, and wherein said input conversion means comprises:

offset value register means for storing offset values for respective ones of said plurality of functions, address register means for storing maximum and minimum addresses of address regions for respective ones of said plurality of functions, adder means for carrying out floating point addition of said input variable and an offset value being read from said offset value register means, comparison means for comparing an output of said adder means with an exponent part and an output value of said offset value being read from said offset value register means, address switching means for expansively adding the most significant bit of mantissa data of data being outputted from said adder means in accordance with a selection signal, address selection means for reading a corresponding address from said address register means in accordance with an output of said comparison means, and selection means for adding up an output of said address switching means and one of addresses read from said address register means in accordance with said output of said comparison means.

24. A nonlinear function generator comprising:

a memory for storing a value of a mantissa of floating-point representation of each function value of a nonlinear function being so translated that a value of an exponent part in floating-point representation of a value in each of an input variable area and a corresponding nonlinear function value area is constant, with a translated variable as an address;

input conversion means for translating an input variable of floating-point representation by a value corresponding to said translation;

address generation means for generating an address for said memory in accordance with an output value of said input conversion means;

output conversion means for converting a nonlinear function value being read from said memory to an output value of floating-point representation in accordance with said value of the constant exponent part value; and output means for translating an output value from said output conversion means in a direction opposite to that of said translation thereby generating a final output value.

25. A format converter including:

conversion means for linking at least an exponent of a predetermined first value to an input variable of fixed-point representation in a first value area thereby producing numeric data of floating-point representation being included in a second value area, said second value area having an exponent part of said predetermined value including a numeric value being in one-to-one correspondence to that in said first value area; and means for subtracting a predetermined second value from numeric data being produced by said conversion means, said predetermined second value being equal to a difference between said numeric value in said second value area and the corresponding numeric value in said first value area.

26. The format converter in accordance with claim 25, wherein said conversion means includes means for executing a floating point operation of said offset value and said numeric data.

27. A format converter comprising:

adder means for floating point-adding a predetermined offset value to an input variable of floating-point representation in a first value area; and extraction means for extracting numeric data of a mantissa being included in an output value of said adder means, said offset value indicating an amount of movement in translation of each numeric value in said first value area into a second value area, numeric values of floating-point representation in said second value area having exponent parts of a common value.

28. The format converter in accordance with claim 27, wherein said first value area includes positive and negative regions.

* * * * *